(12) United States Patent
Sengupta et al.

(10) Patent No.: US 11,877,299 B2
(45) Date of Patent: Jan. 16, 2024

(54) CONTROL CHANNEL RESOURCES FOR GROUP-FEEDBACK IN MULTI-CAST

(71) Applicant: QUALCOMM Incorporated, San Diego, CA (US)

(72) Inventors: Ayan Sengupta, San Diego, CA (US); Alberto Rico Alvarino, San Diego, CA (US); Peter Gaal, San Diego, CA (US); Tao Luo, San Diego, CA (US); Kazuki Takeda, Tokyo (JP); Juan Montojo, San Diego, CA (US); Le Liu, Fremont, CA (US); Xiaoxia Zhang, San Diego, CA (US); Wanshi Chen, San Diego, CA (US); Umesh Phuyal, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/188,128

(22) Filed: Mar. 1, 2021

(65) Prior Publication Data

US 2021/0282115 A1 Sep. 9, 2021

Related U.S. Application Data

(60) Provisional application No. 62/985,545, filed on Mar. 5, 2020.

(51) Int. Cl.
*H04W 72/30* (2023.01)
*H04W 72/02* (2009.01)
(Continued)

(52) U.S. Cl.
CPC ........... *H04W 72/30* (2023.01); *H04L 1/1896* (2013.01); *H04W 72/02* (2013.01);
(Continued)

(58) Field of Classification Search
CPC ............... H04W 72/005; H04W 72/02; H04W 72/0446; H04W 72/0453; H04W 72/046;
(Continued)

(56) References Cited

U.S. PATENT DOCUMENTS 8,705,655 B2 * 4/2014 Hariharan ............. H04L 5/0048
375/299
9,591,645 B2 * 3/2017 Seol ..................... H04B 7/0695
(Continued)

FOREIGN PATENT DOCUMENTS

EP 2187549 A1 5/2010
WO WO-2017171616 A1 10/2017

OTHER PUBLICATIONS

Mediatek Inc: "Physical layer procedures for sidelink", 3GPP Draft, 3GPP TSG RAN WG1 #99, R1-1912109, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823202, 11 Pages, Retrieved from the Internet: URL: https://ftp.3gpp.org/tsg_ran/WG1_RL1/TSGR1_99/Docs/R1-1912109.zip. R1-1912109.docx [retrieved on Nov. 9, 2019] sections 3.2 and 3.2.1.

(Continued)

*Primary Examiner* — Dung B Huynh
(74) *Attorney, Agent, or Firm* — Holland & Hart LLP

(57) ABSTRACT

Wireless communications are described. A user equipment (UE) may receive a configuration message identifying a set of resources available for a plurality of UEs for transmission of feedback indications of multi-cast (or broadcast) transmission to the plurality of UEs, the set of resources comprising a plurality of subsets of resources, each subset of resources being associated with a corresponding channel metric for each UE of the plurality of UEs receiving the multi-cast transmission. The UE may determine that a (Continued)

feedback indication is to be provided in response to the multi-cast transmission. The UE may select, based at least in part on a channel metric of the UE, a first subset of the plurality of subsets of resources to use for transmitting a feedback message including the feedback indication. The UE may transmit the feedback message for the multi-cast transmission using resources within the selected first subset of resources.

29 Claims, 17 Drawing Sheets

(51) Int. Cl.
 H04W 72/044 (2023.01)
 H04W 80/02 (2009.01)
 H04W 72/0453 (2023.01)
 H04W 72/0446 (2023.01)
 H04L 1/1867 (2023.01)
 H04W 72/53 (2023.01)

(52) U.S. Cl.
 CPC ..... *H04W 72/046* (2013.01); *H04W 72/0446* (2013.01); *H04W 72/0453* (2013.01); *H04W 72/53* (2023.01); *H04W 80/02* (2013.01)

(58) Field of Classification Search
 CPC .......... H04W 72/0493; H04L 1/1671; H04L 1/1854; H04L 1/1861; H04L 1/1896; H04L 2001/0093; H04L 5/001; H04L 5/0023; H04L 5/0048; H04L 5/0053; H04L 5/0055; H04L 5/006; H04L 5/0069; H04L 5/0085; H04L 5/0094; H04L 5/0096; H04L 5/14
 See application file for complete search history.

(56) References Cited

U.S. PATENT DOCUMENTS

| | | | |
|---|---|---|---|
| 10,057,018 B2* | 8/2018 | Lin | H04L 1/1861 |
| 10,375,733 B2* | 8/2019 | Jeong | H04W 74/0833 |
| 11,196,531 B2* | 12/2021 | Takeda | H04L 1/1854 |
| 11,252,753 B2* | 2/2022 | Chen | H04L 1/1822 |
| 11,265,132 B2* | 3/2022 | Fujishiro | H04L 1/1854 |
| 11,271,699 B1* | 3/2022 | Eyuboglu | H04W 80/02 |
| 11,457,414 B2* | 9/2022 | Yao | H04L 25/0226 |
| 11,457,475 B2* | 9/2022 | Oteri | H04L 5/0048 |
| 2010/0208629 A1* | 8/2010 | Ahn | H04L 5/0053 370/280 |
| 2011/0243066 A1* | 10/2011 | Nayeb Nazar | H04L 1/0073 370/328 |
| 2011/0274059 A1* | 11/2011 | Brown | H04L 5/0064 370/329 |
| 2012/0064904 A1* | 3/2012 | Lee | H04W 72/082 455/450 |
| 2012/0257562 A1* | 10/2012 | Kim | H04W 4/06 370/312 |
| 2013/0235742 A1* | 9/2013 | Josiam | H04W 24/10 370/252 |
| 2015/0326492 A1* | 11/2015 | Jeong | H04W 74/0875 370/329 |
| 2016/0173262 A1* | 6/2016 | Davydov | H04W 48/16 370/329 |
| 2017/0111924 A1* | 4/2017 | Josiam | H04W 24/10 |
| 2018/0019852 A1* | 1/2018 | Soldati | H04L 5/0053 |
| 2018/0083752 A1* | 3/2018 | Kim | H04L 65/40 |
| 2018/0234959 A1* | 8/2018 | Ahn | H04W 72/20 |
| 2018/0254872 A1* | 9/2018 | Seo | H04L 5/0055 |
| 2018/0317213 A1* | 11/2018 | Islam | H04W 72/0406 |
| 2018/0323885 A1* | 11/2018 | Horiuchi | H04B 17/318 |
| 2018/0343669 A1* | 11/2018 | Wang | H04W 74/0816 |
| 2018/0375633 A1* | 12/2018 | Gao | H04L 5/0053 |
| 2019/0052398 A1* | 2/2019 | Prasad | H04L 1/0026 |
| 2019/0104549 A1* | 4/2019 | Deng | H04W 74/0833 |
| 2019/0109697 A1* | 4/2019 | Lee | H04L 5/1438 |
| 2019/0123923 A1* | 4/2019 | Belleschi | H04L 1/08 |
| 2019/0132104 A1* | 5/2019 | Lee | H04L 1/1664 |
| 2019/0150187 A1* | 5/2019 | Park | H04L 5/0094 370/330 |
| 2019/0215685 A1* | 7/2019 | Wang | H04W 4/40 |
| 2019/0261278 A1* | 8/2019 | Gupta | H04W 52/146 |
| 2019/0306879 A1* | 10/2019 | Seo | H04W 74/02 |
| 2019/0306923 A1* | 10/2019 | Xiong | H04L 27/261 |
| 2019/0349063 A1* | 11/2019 | Takano | H04B 7/0695 |
| 2019/0350031 A1* | 11/2019 | Bedekar | H04W 72/0413 |
| 2019/0357205 A1* | 11/2019 | Li | H04B 7/0697 |
| 2019/0372727 A1* | 12/2019 | Joseph | H04B 17/336 |
| 2019/0372740 A1* | 12/2019 | Seol | H04W 72/048 |
| 2019/0373598 A1* | 12/2019 | Kundu | H04L 5/0057 |
| 2019/0373630 A1* | 12/2019 | Gupta | H04W 72/1231 |
| 2020/0007296 A1* | 1/2020 | Papasakellariou | H04L 5/0042 |
| 2020/0028640 A1* | 1/2020 | Yeo | H04L 5/0007 |
| 2020/0029340 A1* | 1/2020 | He | H04W 72/10 |
| 2020/0100232 A1* | 3/2020 | Onggosanusi | H04B 7/0691 |
| 2020/0119778 A1* | 4/2020 | Grant | H04B 7/0619 |
| 2020/0154446 A1* | 5/2020 | Yerramalli | H04L 5/001 |
| 2020/0163059 A1* | 5/2020 | Zhang | H04B 7/0617 |
| 2020/0196216 A1* | 6/2020 | Hui | H04W 36/305 |
| 2020/0204329 A1* | 6/2020 | Fujishiro | H04L 56/0045 |
| 2020/0213031 A1* | 7/2020 | Gao | H04W 72/1257 |
| 2020/0220694 A1* | 7/2020 | Khoryaev | H04L 1/1816 |
| 2020/0252778 A1* | 8/2020 | Dong | H04M 1/72418 |
| 2020/0275437 A1* | 8/2020 | Shi | H04L 5/0053 |
| 2020/0296713 A1* | 9/2020 | Matsumura | H04W 72/12 |
| 2020/0322921 A1* | 10/2020 | Zhou | H04L 1/1896 |
| 2020/0336253 A1* | 10/2020 | He | H04W 4/40 |
| 2020/0383060 A1* | 12/2020 | Park | H04W 52/42 |
| 2020/0396040 A1* | 12/2020 | Miao | H04W 4/40 |
| 2020/0404593 A1* | 12/2020 | Yao | H04W 52/08 |
| 2021/0028890 A1* | 1/2021 | Rico Alvarino | H04L 1/1812 |
| 2021/0036831 A1* | 2/2021 | Utkovski | H04L 5/0053 |
| 2021/0050897 A1* | 2/2021 | Huang | H04W 72/0413 |
| 2021/0058209 A1* | 2/2021 | Qin | H04W 72/1226 |
| 2021/0058967 A1* | 2/2021 | Oteri | H04W 72/042 |
| 2021/0153164 A1* | 5/2021 | Takeda | H04B 7/0632 |
| 2021/0159963 A1* | 5/2021 | Akkarakaran | H04B 7/088 |
| 2021/0204097 A1* | 7/2021 | Takeda | H04L 1/1861 |
| 2021/0227537 A1* | 7/2021 | Yamamoto | H04L 5/0053 |
| 2021/0250132 A1* | 8/2021 | Chen | H04B 7/0632 |
| 2021/0250905 A1* | 8/2021 | Liu | H04L 5/0055 |
| 2021/0250954 A1* | 8/2021 | Li | H04L 1/1887 |
| 2021/0258100 A1* | 8/2021 | Hassan | H04W 72/1257 |
| 2021/0266951 A1* | 8/2021 | Gulati | H04B 17/382 |
| 2021/0274503 A1* | 9/2021 | Farag | H04L 5/0094 |
| 2021/0282114 A1* | 9/2021 | Liu | H04B 7/0695 |
| 2021/0298108 A1* | 9/2021 | Wu | H04W 56/0045 |
| 2021/0321464 A1* | 10/2021 | Lin | H04W 76/11 |
| 2021/0337527 A1* | 10/2021 | Hui | H04L 5/0055 |
| 2021/0367740 A1* | 11/2021 | Chen | H04L 1/1861 |
| 2021/0377892 A1* | 12/2021 | Chen | H04L 5/0051 |
| 2021/0377912 A1* | 12/2021 | El Hamss | H04L 1/1819 |
| 2021/0385023 A1* | 12/2021 | Wang | H04W 72/0453 |
| 2021/0410129 A1* | 12/2021 | Freda | H04W 72/087 |
| 2022/0007431 A1* | 1/2022 | Qiu | H04W 74/006 |
| 2022/0046744 A1* | 2/2022 | Bao | H04W 76/28 |
| 2022/0052742 A1* | 2/2022 | Huang | H04L 5/0091 |
| 2022/0069951 A1* | 3/2022 | Parkvall | H04L 1/1861 |
| 2022/0070845 A1* | 3/2022 | Stauffer | H04B 7/0697 |
| 2022/0085923 A1* | 3/2022 | Ye | H04L 1/1825 |
| 2022/0095309 A1* | 3/2022 | MolavianJazi | H04W 56/001 |
| 2022/0103225 A1* | 3/2022 | Ling | H04L 5/0094 |
| 2022/0110096 A1* | 4/2022 | Lin | H04B 17/318 |
| 2022/0116956 A1* | 4/2022 | Sun | H04L 5/0055 |
| 2022/0124538 A1* | 4/2022 | Shen | H04W 36/0058 |
| 2022/0131665 A1* | 4/2022 | Stauffer | H04B 7/0408 |
| 2022/0132493 A1* | 4/2022 | Fakoorian | H04W 80/02 |
| 2022/0132549 A1* | 4/2022 | Yu | H04L 1/1812 |
| 2022/0141861 A1* | 5/2022 | Rico Alvarino | H04L 12/189 370/312 |
| 2022/0150730 A1* | 5/2022 | Freda | H04L 1/188 |
| 2022/0166539 A1* | 5/2022 | Bergman | H04L 1/08 |

(56) References Cited

U.S. PATENT DOCUMENTS

| | | | |
|---|---|---|---|
| 2022/0201654 A1* | 6/2022 | Lee | H04W 72/0406 |
| 2022/0225121 A1* | 7/2022 | Wanuga | H04W 24/08 |
| 2022/0256579 A1* | 8/2022 | Ji | H04L 1/1887 |
| 2022/0279575 A1* | 9/2022 | Lei | H04L 1/0061 |
| 2022/0287019 A1* | 9/2022 | Van Phan | H04W 72/02 |
| 2022/0303952 A1* | 9/2022 | Hoang | H04L 5/0053 |
| 2022/0376836 A1* | 11/2022 | Cheng | H04L 1/1887 |
| 2023/0019024 A1* | 1/2023 | Stare | H04W 72/30 |
| 2023/0076897 A1* | 3/2023 | Svedman | H04W 72/23 |
| 2023/0095951 A1* | 3/2023 | Lu | H04L 1/1854 |
| | | | 370/312 |

OTHER PUBLICATIONS

Nokia, et al., "Discussion on Sidelink Physical Layer Procedures", 3GPP Draft, 3GPP TSG-RAN WG1 Meeting #96bis, R1-1905337, Nokia-5G V2X NRSL-Sidelink Procedures, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 3, 2019 (Apr. 3, 2019), XP051707412, 8 Pages, Retrieved from the Internet: URL: http://www.3gpp.org/ftp/tsg%5Fran/WG1%5FRL1/TSGR1% 5F96b/Docs/R1%2D1905337%2Ezi p. [retrieved on Apr. 3, 2019] section 2.2.
Partial International Search Report—PCT/US2021/020394—ISA/EPO—dated Jun. 6, 2021.
International Search Report and Written Opinion—PCT/US2021/020394—ISA/EPO—dated Sep. 17, 2021.

* cited by examiner

CONTROL CHANNEL RESOURCES FOR GROUP-FEEDBACK IN MULTI-CAST

CROSS REFERENCE

The present Application for Patent claims the benefit of U.S. Provisional Patent Application No. 62/985,545 by SENGUPTA et al., entitled "CONTROL CHANNEL RESOURCES FOR GROUP-FEEDBACK IN MULTI-CAST," filed Mar. 5, 2020, assigned to the assignee hereof, and expressly incorporated by reference herein.

FIELD OF TECHNOLOGY

The following relates generally to wireless communications and more specifically to control channel resources for group-feedback in multi-cast.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support control channel (e.g., physical uplink control channel (PUCCH)) resources for group-feedback in multi-cast. Broadly, aspects of the described techniques support various mechanisms that improve PUCCH feedback message transmissions in response to a multi-cast transmission. Aspects of the described techniques provide for provisioning different subsets of resources from a set of resources for user equipment (UEs) to use for the feedback message transmission based on channel metric(s) of the UE. For example, the base station may configure UEs associated with a multi-cast transmission with the set of resources, e.g., time/frequency/sequence/spatial resources for the UE to use for transmitting a feedback indication in a feedback message. The set of resources may include a plurality of subsets of resources, with each subset of resources being associated with a corresponding channel metric (or a range of channel metrics) associated with each UE receiving the multi-cast transmission. Each UE may determine that a feedback indication is to be provided in response to the multi-cast transmission, and then select a first subset of resources (or simply a subset of resources) from the plurality of subsets of resources based on its own channel metric. The channel metric in this context may be geographically based (e.g., beamforming angle-of-arrival/angle-of-departure information, transmit/receive beam, physical location within a cell, a location relative to a base station, etc.), performance-based (e.g., reference signal received power (RSRP), interference level, throughput level, etc.), or any combination thereof. Accordingly, each UE having a feedback indication to be provided in response to a multi-cast transmission may select a subset of resources based on its channel metric, and then transmit the feedback message (e.g., conveying the feedback indication) for the multi-cast transmission using one or more resources within the selected subset of resources (e.g., within the first subset of resources).

A method of wireless communication at a UE is described. The method may include receiving a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, determining that a feedback indication is to be provided in response to the multi-cast or broadcast transmission, selecting, based on a channel metric of the UE, a first subset of the set of subsets of resources to use for transmitting a feedback message including the feedback indication, and transmitting the feedback message for the multi-cast or broadcast transmission using resources within the selected first subset of resources.

An apparatus for wireless communication at a UE is described. The apparatus may include a processor, memory coupled with the processor, and instructions stored in the memory. The instructions may be executable by the processor to cause the apparatus to receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, determine that a feedback indication is to be provided in response to the multi-cast or broadcast transmission, select, based on a channel metric of the UE, a first subset of the set of subsets of resources to use for transmitting a feedback message including the feedback indication, and transmit the feedback message for the multi-cast or broadcast transmission using resources within the selected first subset of resources.

Another apparatus for wireless communication at a UE is described. The apparatus may include means for receiving a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, determining that a feedback indication is to be provided in response to the multi-cast or broadcast transmission, selecting, based on a channel metric of the UE, a first subset of the set of subsets of resources to use for transmitting a feedback message including the feedback indication, and transmitting the feedback message for the multi-cast or broadcast transmission using resources within the selected first subset of resources.

A non-transitory computer-readable medium storing code for wireless communication at a UE is described. The code may include instructions executable by a processor to receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, determine that a feedback indication is to be provided in response to the multi-cast or broadcast transmission, select, based on a channel metric of the UE, a first subset of the set of subsets of resources to use for transmitting a feedback message including the feedback indication, and transmit the feedback message for the multi-cast or broadcast transmission using resources within the selected first subset of resources.

Some examples of the method, apparatuses, and non-transitory computer-readable medium described herein may further include operations, features, means, or instructions for autonomously selecting the first subset of resources to use based on the channel metric.

Some examples of the method, apparatuses, and non-transitory computer-readable medium described herein may further include operations, features, means, or instructions for generating a random number based on a UE-specific feature, and selecting one or more resources within the first subset of resources based on the random number.

Some examples of the method, apparatuses, and non-transitory computer-readable medium described herein may further include operations, features, means, or instructions for receiving a higher layer signal indicating the first subset of resources to select.

In some examples of the method, apparatuses, and non-transitory computer-readable medium described herein, the higher layer signal indicates at least a portion of the resources in the first subset of resources to select.

In some examples of the method, apparatuses, and non-transitory computer-readable medium described herein, the higher layer signal includes at least one of a radio resource control (RRC) signal, a multi-cast control channel (MCCH) signal, or a combination thereof.

Some examples of the method, apparatuses, and non-transitory computer-readable medium described herein may further include operations, features, means, or instructions for receiving at least one of a higher layer signal, a downlink control information, or a combination thereof, either explicitly or implicitly indicating an updated set of resources, the updated set of resources including a change to the subset of resources associated with each channel metric.

Some examples of the method, apparatuses, and non-transitory computer-readable medium described herein may further include operations, features, means, or instructions for determining that the channel metric of the UE may have changed beyond a threshold, and selecting an updated subset of resources from the set of resources based on the changed channel metric of the UE.

Some examples of the method, apparatuses, and non-transitory computer-readable medium described herein may further include operations, features, means, or instructions for autonomously selecting the updated subset of resources based on the changed channel metric of the UE.

Some examples of the method, apparatuses, and non-transitory computer-readable medium described herein may further include operations, features, means, or instructions for transmitting an indication that the channel metric of the UE may have changed beyond the threshold.

Some examples of the method, apparatuses, and non-transitory computer-readable medium described herein may further include operations, features, means, or instructions for receiving an indication of the updated subset of resources to select based on the indication that the channel metric of the UE may have changed beyond the threshold.

Some examples of the method, apparatuses, and non-transitory computer-readable medium described herein may further include operations, features, means, or instructions where the candidate resources in the first subset of resources include one or more guard symbols.

Some examples of the method, apparatuses, and non-transitory computer-readable medium described herein may further include operations, features, means, or instructions for where candidate resources in the first subset of resources include one or more orthogonal cyclic shifts of a base sequence that may be different from orthogonal cyclic shifts associated with different subsets of resources of the set of subsets of resources.

Some examples of the method, apparatuses, and non-transitory computer-readable medium described herein may further include operations, features, means, or instructions for identifying a receive beam used for the multi-cast or broadcast transmission, and selecting a transmit beam for transmitting the feedback message based on the receive beam.

Some examples of the method, apparatuses, and non-transitory computer-readable medium described herein may further include operations, features, means, or instructions for identifying a transmit beam associated with the selected first subset of resources, and using the transmit beam for transmitting the feedback message based on the selected first subset of resources.

Some examples of the method, apparatuses, and non-transitory computer-readable medium described herein may further include operations, features, means, or instructions for identifying an antenna switching configuration associated with the selected first subset of resources, and implementing the antenna switching configuration for transmitting the feedback message.

Some examples of the method, apparatuses, and non-transitory computer-readable medium described herein may further include operations, features, means, or instructions for identifying information associated with a timing advance associated with the selected first subset of resources, and applying the timing advance in transmitting the feedback message based on the information.

Some examples of the method, apparatuses, and non-transitory computer-readable medium described herein may further include operations, features, means, or instructions for determining that acknowledgement/negative-acknowledgement information may be to be simultaneously transmitted in response to a unicast transmission, and transmitting the feedback message indicating the acknowledgement/negative-acknowledgement information and without the feedback indication.

Some examples of the method, apparatuses, and non-transitory computer-readable medium described herein may further include operations, features, means, or instructions for determining that acknowledgement/negative-acknowledgement information may be to be transmitted in response to a unicast transmission, and multiplexing the feedback indication with the acknowledgement/negative-acknowledgement information for the unicast transmission.

In some examples of the method, apparatuses, and non-transitory computer-readable medium described herein, a quantity of resources in the first subset of resources may be different from quantities of resources in one or more other subsets of resources of the set of subsets of resources, and each subset of resources may be associated with a different range of channel metrics for the set of UEs.

In some examples of the method, apparatuses, and non-transitory computer-readable medium described herein, the channel metric associated with each subset of resources includes a reference signal received power (RSRP) threshold range, and subsets of resources associated with a higher RSRP threshold range include a lower quantity of resources than subsets of resources associated with a lower RSRP threshold range.

In some examples of the method, apparatuses, and non-transitory computer-readable medium described herein, the channel metric includes at least one of a RSRP, or a reference signal strength indicator (RSSI), or a beamform angle-of-arrival, or a beamform angle-of-departure, or a transmit beam, or a receive beam, or a geographical location, or an interference level, or a CSI metric, or a throughput level, or any combination thereof.

In some examples of the method, apparatuses, and non-transitory computer-readable medium described herein, the configuration message includes a MCCH message.

In some examples of the method, apparatuses, and non-transitory computer-readable medium described herein, the resources in the set of resources include at least one of a frequency resource, or a time resource, or a sequence, or a spatial resource, or any combination thereof.

In some examples of the method, apparatuses, and non-transitory computer-readable medium described herein, the feedback indication includes a negative-acknowledgement indication.

Some examples of the method, apparatuses, and non-transitory computer-readable medium described herein may further include operations, features, means, or instructions for identifying a duplexing configuration of the UE, where selecting the first subset of resources may be based on the duplexing configuration.

A method of wireless communication at a base station is described. The method may include selecting a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, transmitting a configuration message to the set of UEs identifying the set of resources, transmitting the multi-cast or broadcast transmission to the set of UEs, and receiving, from each of one or more UE in the set of UEs, a feedback message indicating the feedback for the multi-cast or broadcast transmission using resources within at least a first subset of resources.

An apparatus for wireless communication at a base station is described. The apparatus may include a processor, memory coupled with the processor, and instructions stored in the memory. The instructions may be executable by the processor to cause the apparatus to select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, transmit a configuration message to the set of UEs identifying the set of resources, transmit the multi-cast or broadcast transmission to the set of UEs, and receive, from each of one or more UE in the set of UEs, a feedback message indicating the feedback for the multi-cast or broadcast transmission using resources within at least a first subset of resources.

Another apparatus for wireless communication at a base station is described. The apparatus may include means for selecting a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, transmitting a configuration message to the set of UEs identifying the set of resources, transmitting the multi-cast or broadcast transmission to the set of UEs, and receiving, from each of one or more UE in the set of UEs, a feedback message indicating the feedback for the multi-cast or broadcast transmission using resources within at least a first subset of resources.

A non-transitory computer-readable medium storing code for wireless communication at a base station is described. The code may include instructions executable by a processor to select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, transmit a configuration message to the set of UEs identifying the set of resources, transmit the multi-cast or broadcast transmission to the set of UEs, and receive, from each of one or more UE in the set of UEs, a feedback message indicating the feedback for the multi-cast or broadcast transmission using resources within at least a first subset of resources.

Some examples of the method, apparatuses, and non-transitory computer-readable medium described herein may further include operations, features, means, or instructions for transmitting a higher layer signal indicating the first subset of resources for the UE to select.

In some examples of the method, apparatuses, and non-transitory computer-readable medium described herein, the higher layer signal indicates at least a portion of the resources in the first subset of resources for the UE to select.

In some examples of the method, apparatuses, and non-transitory computer-readable medium described herein, the higher layer signal includes at least one of a RRC signal, a MCCH signal, or a combination thereof.

Some examples of the method, apparatuses, and non-transitory computer-readable medium described herein may further include operations, features, means, or instructions for transmitting at least one of a higher layer signal, a downlink control information, or a combination thereof, either explicitly or implicitly indicating an updated set of resources, the updated set of resources including a change to the subset of resources associated with each channel metric.

Some examples of the method, apparatuses, and non-transitory computer-readable medium described herein may further include operations, features, means, or instructions for receiving an indication that the channel metric of at least one UE may have changed beyond a threshold.

Some examples of the method, apparatuses, and non-transitory computer-readable medium described herein may further include operations, features, means, or instructions for selecting an updated subset of resources from the set of resources based on the changed channel metric of the at least one UE, and transmitting an indication of the updated subset of resources to select to the at least one UE.

In some examples of the method, apparatuses, and non-transitory computer-readable medium described herein, the channel metric associated with each subset of resources includes a RSRP threshold range, and subsets of resources associated with a higher RSRP threshold range include a lower quantity of resources than subsets of resources associated with a lower RSRP threshold range.

Some examples of the method, apparatuses, and non-transitory computer-readable medium described herein may further include operations, features, means, or instructions for where candidate resources in the first subset of resources include one or more guard symbols.

Some examples of the method, apparatuses, and non-transitory computer-readable medium described herein may further include operations, features, means, or instructions for where candidate resources in the first subset of resources include one or more orthogonal cyclic shifts of a base sequence that may be different from orthogonal cyclic shifts associated with different subsets of resources of the set of subsets of resources.

In some examples of the method, apparatuses, and non-transitory computer-readable medium described herein, each feedback message may be received using a UE transmit beam that may be selected based on a receive beam that each UE uses to receive the multi-cast or broadcast transmission.

In some examples of the method, apparatuses, and non-transitory computer-readable medium described herein, each feedback message may be received using a UE transmit beam that may be selected based on a transmit beam associated with the subset of resources that the UE selects.

Some examples of the method, apparatuses, and non-transitory computer-readable medium described herein may further include operations, features, means, or instructions for receiving the feedback message according to an antenna switching configuration associated with the subset of resources that the UE selects.

Some examples of the method, apparatuses, and non-transitory computer-readable medium described herein may further include operations, features, means, or instructions for receiving the feedback message according to a timing advance associated with the subset of resources that the UE selects.

Some examples of the method, apparatuses, and non-transitory computer-readable medium described herein may further include operations, features, means, or instructions for determining that acknowledgement/negative-acknowledgement information may be to be simultaneously received in response to a unicast transmission, and receiving the feedback message indicating the acknowledgement/negative-acknowledgement information and without the feedback indication.

Some examples of the method, apparatuses, and non-transitory computer-readable medium described herein may further include operations, features, means, or instructions for determining that acknowledgement/negative-acknowledgement information may be to be received in response to a unicast transmission, and receiving the feedback indication multiplexed with the acknowledgement/negative-acknowledgement information for the unicast transmission.

In some examples of the method, apparatuses, and non-transitory computer-readable medium described herein, a quantity of resources in the first subset of resources may be different from quantities of resources in one or more other subsets of resources of the set of subsets of resources, and each subset of resources may be associated with a different range of channel metrics for the set of UEs.

In some examples of the method, apparatuses, and non-transitory computer-readable medium described herein, the channel metric includes at least one of a RSRP, or a RSSI, or a beamform angle-of-arrival, or a beamform angle-of-departure, or a transmit beam, or a receive beam, or a geographical location, or an interference level, or a CSI metric, or a throughput level, or any combination thereof.

In some examples of the method, apparatuses, and non-transitory computer-readable medium described herein, the configuration message includes a MCCH message.

In some examples of the method, apparatuses, and non-transitory computer-readable medium described herein, the resources in the set of resources include at least one of a frequency resource, or a time resource, or a sequence, or a spatial resource, or any combination thereof.

In some examples of the method, apparatuses, and non-transitory computer-readable medium described herein, the feedback indication includes a negative-acknowledgement indication.

DETAILED DESCRIPTION

Figure 1:
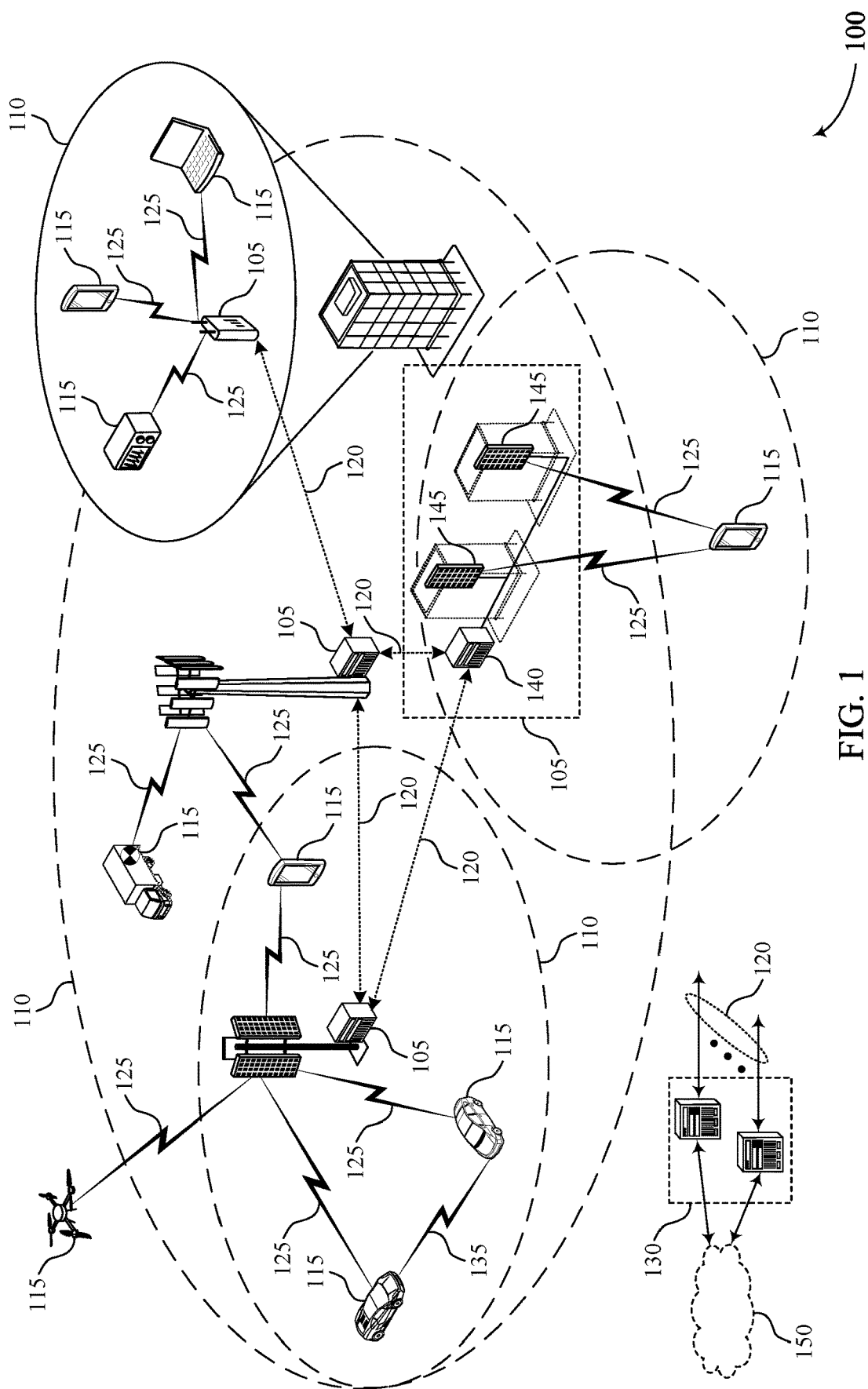
FIG. 1 illustrates an example of a system for wireless communications that supports control channel resources for group-feedback in multi-cast in accordance with aspects of the present disclosure.

Wireless communication systems may support unicast and/or multi-cast transmissions. Unicast transmissions generally describe transmissions between a base station and a specific user equipment (UE). Multi-cast transmissions (which may also be referred to as broadcast transmissions) generally describe transmissions between a base station and a plurality of UEs. UEs may be configured to convey a feedback indication (e.g., acknowledgment/negative-acknowledgment (ACK/NACK) indication, or simply a NACK indication in some examples) in response to receiving a transmission from a base station. In the unicast transmission example, the resources used to convey the feedback indication in the feedback message may be scheduled or otherwise identified when scheduling the downlink transmission to the UE. Resources for transmitting the feedback indication in response to a multi-cast or broadcast transmission are typically configured in a common resources pool, with the UE accessing the common resource pool to transmit a feedback message conveying its feedback indication for the multi-cast or broadcast transmission. However, this approach is inefficient in that UEs selecting from a common resource pool may result in collisions of the feedback messages and/or many resources in the common resource pole are wasted. Accordingly, aspects of the described techniques provide improved mechanisms to configure resources for a feedback message in response to a multi-cast or broadcast transmission in a more adaptable and efficient manner.

Generally, the described techniques provide various mechanisms that support wireless communications in a wireless network. Broadly, aspects of the described techniques support various mechanisms that improve feedback message transmissions in response to a multi-cast or broadcast transmission. Aspects of the described techniques provide for provisioning different subsets of resources from a set of resources for UEs to use for the feedback message transmission based on channel metrics of the UE. For example, the base station may configure UEs associated with a multi-cast or broadcast transmission with the set of resources, e.g., time/frequency/sequence/spatial resources for the UE to use for transmitting a feedback indication in a feedback message. The set of resources may include a plurality of subsets of resources, with each subset of resources being associated with a corresponding channel metric (or a range of channel metrics) associated with each UE receiving the multi-cast or broadcast transmission. Each UE may determine that a feedback indication is to be provided in response to the multi-cast or broadcast transmission, determine its channel metric, and then select a first subset of resources from the plurality of subsets of resources based on its own channel metric. The channel metric in this context may be geographically based (e.g., angle-of-arrival/angle-of-departure information, transmit/receive beam, location within a cell, a location relative to a base station, etc.), performance-based (e.g., reference signal received power (RSRP), interference level, throughput level, etc.), or any combination thereof. Accordingly, each UE having a feedback indication to be provided in response to a multi-cast or broadcast transmission may select a subset of resources based on its channel metric, and then transmit a feedback message (e.g., conveying the feedback indication) for the multi-cast or broadcast transmission using one or more resources within the selected subset of resources (e.g., the first subset of resources).

Aspects of the disclosure are further illustrated by and described with reference to apparatus diagrams, system diagrams, and flowcharts that relate to control channel resources for group-feedback in multi-cast.

FIG. 1 illustrates an example of a wireless communication system 100 that supports control channel resources for group-feedback in multi-cast in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration message identifying a set of resources available for use by a plurality of UEs 115 for transmission of feedback indications of multi-cast or broadcast transmission to the plurality of UEs 115, the set of resources comprising a plurality of subsets of resources, each subset of resources being associated with a corresponding channel metric for each UE 115 of the plurality of UEs 115 receiving the multi-cast or broadcast transmission. The UE 115 may determine that a feedback indication is to be provided in response to the multi-cast or broadcast transmission. The UE 115 may select, based at least in part on a channel metric of the UE 115, a first subset of the plurality of subsets of resources to use for transmitting a feedback message including the feedback indication. The UE 115 may transmit the feedback message for the multi-cast or broadcast transmission using resources within the selected first subset of resources.

A base station 105 may select a set of resources available for use by a plurality of UEs 115 for transmission of feedback indications of multi-cast or broadcast transmission to the plurality of UEs 115, the set of resources comprising a plurality of subsets of resources, each subset of resources being associated with a corresponding channel metric for each UE 115 of the plurality of UEs 115 receiving the multi-cast or broadcast transmission. The base station 105 may transmit a configuration message to the plurality of UEs 115 identifying the set of resources. The base station 105 may transmit the multi-cast or broadcast transmission to the plurality of UEs 115. The base station 105 may receive, from each of one or more UE 115 in the plurality of UEs 115, a feedback message indicating the feedback for the multi-cast or broadcast transmission using resources within at least a first subset of resources.

Figure 2:
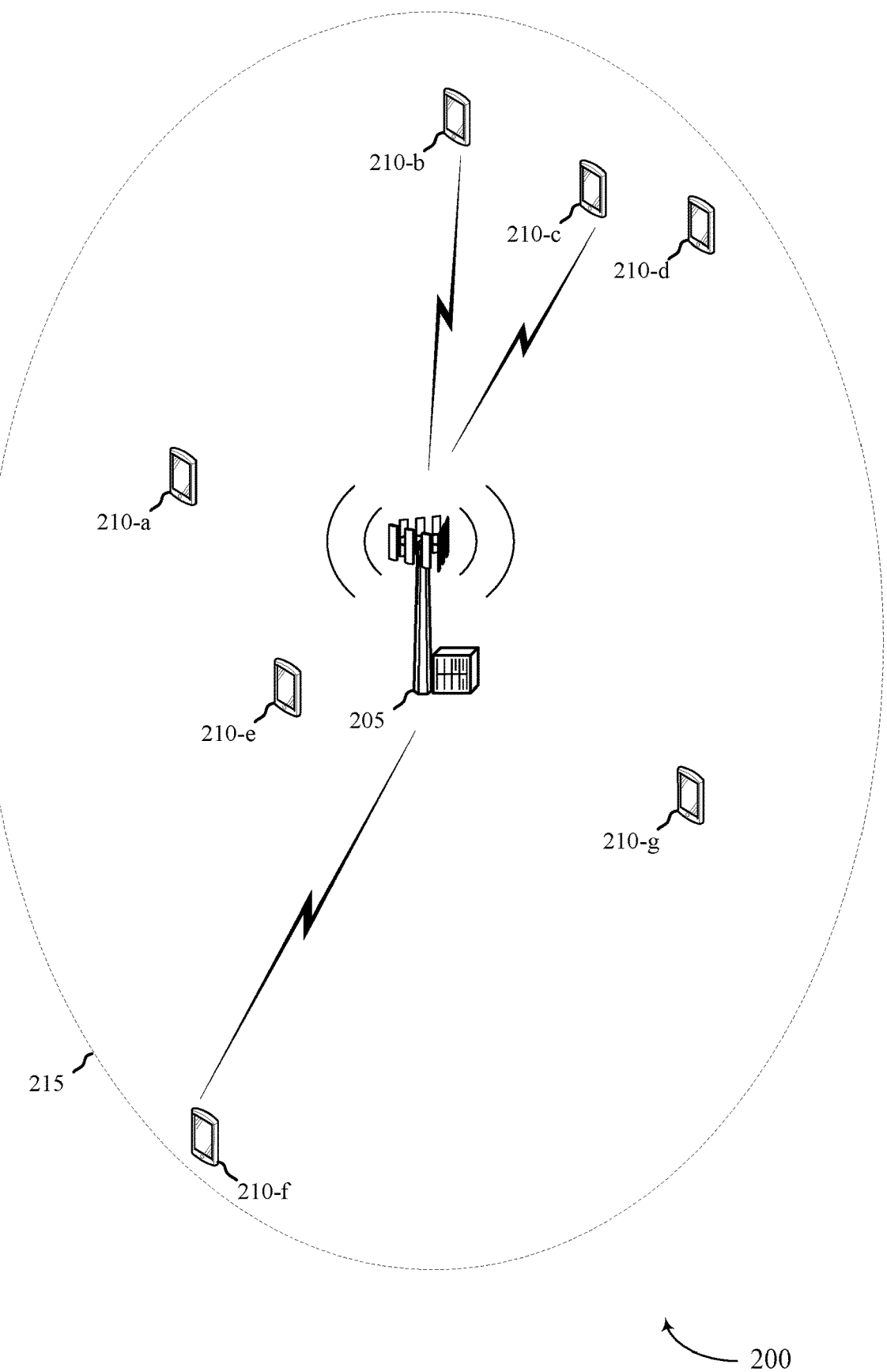
FIG. 2 illustrates an example of a wireless communication system that supports control channel resources for group-feedback in multi-cast in accordance with aspects of the present disclosure.

FIG. 2 illustrates an example of a wireless communication system 200 that supports control channel resources for group-feedback in multi-cast in accordance with aspects of the present disclosure. In some examples, wireless communication system 200 may implement aspects of wireless communication system 100. Wireless communication system 200 may include base station 205 and/or UEs 210, which may be examples of the corresponding devices described herein. Base station 205 may have a corresponding coverage area 215 that includes a plurality of UEs 210, with eight UEs 210 being shown by way of example only.

Wireless communication system 200 may support both unicast and multi-cast or broadcast transmissions. Unicast transmissions may include transmissions from base station 205 to a particular UE 210, such as UE 210-a. Multi-cast or broadcast transmissions may include transmission from base station 205 to a plurality of UEs 210. In the example illustrated in wireless communication system 200, base station 205 is performing a multi-cast or broadcast transmission to each UE 210. Unicast and/or multi-cast or broadcast transmissions may be associated with a corresponding feedback message. That is, base station 205 may perform a unicast and/or multi-cast or broadcast transmission to UEs 210, and then UEs 210 may transmit or otherwise provide a feedback message to base station 205 indicating feedback information for the associated transmission. In the unicast transmission example, this approach is fairly straightforward as the resources for the feedback message are typically indicated in the grant scheduling the unicast transmission. However, this approach may be more complicated in a multi-cast or broadcast transmission scenario as typically such resources are configured in a common resource pool available for all UEs 210 to select from when transmitting feedback indications for the multi-cast or broadcast transmission.

That is, in a multi-cast or broadcast transmission some of the UEs 210 may successfully receive and decode the multi-cast or broadcast transmission, while other UEs 210 are unable to do so. Such feedback information generally provides base station 205 with an indication of the "failure signatures" in the network, which may be used to tailor retransmissions to such signatures. The UEs 210 in this scenario may be configured for a NACK-based or an ACK/NACK-based approach. In the ACK/NACK-based approach, every UE 210 receiving the multi-cast or broadcast transmission responds with a feedback message indicating feedback information (e.g., either ACK or NACK) for the multi-cast or broadcast transmission. In the NACK-based approach, only UEs 210 that are unable to successfully receive and decode the multi-cast or broadcast transmission provide feedback information (e.g., NACK indication) to base station 205 for the multi-cast or broadcast transmission. In the NACK-based feedback, UEs 210 may provide feedback using the same PUCCH resources, e.g., common resources, across time, frequency, orthogonal sequence, and/or spatial resources. However, this common resource approach may be wasteful and, in some examples, ineffective. For example, lumping all of the resources into a common resource pool may result in waste when a low number of UEs 210 need to transmit a NACK indication. Moreover, this approach may be ineffective because UEs 210 selecting from the same resource pool increases the chance that there will be collisions in the feedback message transmissions.

Accordingly, aspects of the described techniques provide various mechanisms that improve resource configuration, selection, and use, for UEs 210 that have a feedback indication to be provided to base station 205 in response to a multi-cast or broadcast transmission. One goal of the described PUCCH resource allocation for multi-cast or broadcast transmissions is to provide "unicast-like" feedback granularity (e.g., base station 205 has the "spatial signatures" of each of the UEs 210 that failed), but without using as much PUCCH overhead as is used in the unicast scenario. At a high level, aspects of the described techniques consider the fact that UEs 210 in a good coverage area (e.g., characterized by high RSRP, low interference, etc.) are less probable (e.g., less likely to need to transmit a NACK indication in a feedback message) than UEs 210 located in the poor coverage area. Accordingly, PUCCH resources (e.g., the set of resources), which may include orthogonal PUCCH sequences, for UEs 210 in good coverage areas may be able to support a larger degree of "resource overloading" across those UEs 210 then UEs 210 located in poor coverage area. Moreover, in some aspects base station 205 may be less interested in the identities of the UEs 210 that failed to successfully receive and decode the multi-cast or broadcast transmission, but may instead be more interested in the spatial signatures of UEs experiencing failure (e.g., where such UEs are located, which frequency/time/sequence resources such UEs are using, etc.).

Within this context, the notion of a good coverage area as compared to a poor coverage area may be defined in terms of a channel metric associated with each UE 210. At a high level, the channel metric may refer to the ability of each UE 210 to successfully communicate in the uplink and downlink with base station 205. That is, the channel metric may refer to the RSRP, reference signal strength indicator (RSSI), an angle-of-arrival/angle-of-departure (AoA/AoD) associated with beamformed communications between base station 205 and UE 210, a transmit/receive beam used for communications between base station 205 and UE 210, a geographical location of the UE 210 within the coverage area 215 of base station 205, an interference level, the CSI metric, a throughput level, and/or any other measurement, observation, and/or feature associated with the communication performance between base station 205 and the UE 210. In some aspects, each UE 210 may track or otherwise be aware of its channel metric (e.g., based on communications with base station 205).

In some aspects, base station 205 may identify or otherwise select a set of resources for a plurality of UEs 210 to use for transmission of a feedback indication for a multi-cast or broadcast transmission. The set of resources may include a plurality of subsets of resources, with each subset of resources associated with a corresponding channel metric (or channel metric range) for each UE 210 receiving the multi-cast or broadcast transmission. For example, each subset of resources may be associated with a corresponding range of channel metrics (e.g., a range of RSRP threshold values, a range of spatial features, a range of distances of the UE 210 from base station 205, a range of supported throughput values, and the like). Accordingly, each subset of resources may include one or more resources (e.g., time, frequency, sequences/code, and/or spatial resources) that can be used by a UE 210 having a corresponding channel metric for transmission of a feedback message in response to the multi-cast or broadcast transmission.

In some aspects, the set of resources are evenly divided (e.g., uniform) according to the range of available channel metrics. That is, each subset of resources may have the same quantity of resources, with the actual resources being different between different subsets of resources. In another example, at least some of the subsets of resources may have different quantities (e.g., may not be uniform). At a high level, this may include an increased quantity of resources within a subset of resources for low channel metric UEs 210 (e.g., UEs 210 having low RSRP, high interference, edge UEs 210, etc.). Each subset of resources may have a slightly higher quantity of resources as the corresponding channel metric falls (e.g., a higher quantity of resources in the subsets of resources associated with low channel metrics and/or lower quantity of resources in the subsets of resources associated with high channel metrics).

Accordingly, base station 205 may select the set of resources available for use and transmit a configuration message to the plurality of UEs 210 identifying the set of resources. The configuration message may be transmitted in a higher layer message (e.g., an RRC message, a multi-cast control channel (MCCH) signal, and the like) transmitted to the UEs 210 receiving the multi-cast or broadcast transmission. As discussed, the allocation of the set of resources may be based on the signal strength/quality of the multi-cast reception at each UE 210 (e.g., may depend on the RSRP threshold, angular directions in altitude and azimuth, transmit/receive beams, geographical locations, etc.). Broadly, combining the indicators discussed above (e.g., the channel metrics) with the higher layer signaling, a UE 210 may be able to determine or otherwise select a subset of resources from the set of resources that it may access for NACK transmission, if required, based on its channel metric.

Accordingly, each UE 210 may receive the configuration signal identifying the set of resources available for use by the UEs 210 for transmitting a feedback indication in response to a multi-cast or broadcast transmission from base station 205. Base station 205 may transmit the multi-cast or broadcast transmission to each of the UEs 210. As discussed, some of the UEs 210 may be able to successfully receive and decode multi-cast or broadcast transmission, and therefore may not need to transmit a feedback indication to base station 205. However, other UEs 210 may be unable to successfully receive and decode the multi-cast or broadcast transmission and may therefore determine that a feedback indication (e.g., a NACK indication) needs to be provided to base station 205 in response to the multi-cast or broadcast transmission. In the example illustrated in the wireless communication system 200, UEs 210-b, 210-c, and 210-f are unable to successfully receive and decode the multi-cast or broadcast transmission, and therefore determine that the feedback indication is to be provided to base station 205 in response to the multi-cast or broadcast transmission. However, it is to be understood that any of the UEs 210 may be configured to support the described techniques.

Accordingly, UEs 210-b, 210-c, and 210-f may each select a subset of resources from the plurality of subsets of resources to use for transmitting the feedback indication in the feedback message. As discussed above, each subset of resources from the plurality of subsets of resources may be associated with a unique channel metric (or range of channel metrics). Accordingly, UEs 210-b, 210-c, and 210-f may each select a different subset of resources or the same subset of resources, e.g., depending on their corresponding channel metric. That is, UE 210-b may identify or otherwise determine its channel metric and then select a subset of resources from the plurality of resources based on that subset of resources being associated with its channel metric. Similarly, UE 210-f may identify or otherwise determine its channel metric and then select a subset of resources from the plurality of resources based on that subset of resources being associated with its channel metric.

Once the UEs 210 have determined or otherwise selected the subset of resources that it may use, there may be multiple options for determining the exact resource from within the selected subset of resources to use for transmission of its feedback message. In one option, the UE 210 may autonomously select the subset of resources to use based on its channel metric. In this UE-driven approach, the UE 210 determines the resource within the subset of resources autonomously. For this, the UE 210 may use a probabilistic resource selection metric. For example, the UE 210 may select a resource based on a pseudorandom number which is generated using UE-specific parameters (such as a UE identifier, UE RSRP, UE-specific coordinates, and/or some other UE-specific feature) as the initial seed. Accordingly, the UE 210 may generate the random number based on its UE-specific feature and then select resource(s) within the selected subset of resources based on the random number.

In another example, UE 210 may select the resource from within the subset of resources based on coordination with base station 205. That is, UE 210 may receive a higher layer signal (e.g., RRC signal, MCCH signal, etc.) indicating the subset of resources to select and/or the resources within the subset of resources to select. In this base station-driven approach, during an RRC connected state, base station 205 may provide the UE 210 with the exact resources to use for each of the subsets of resources, if needed. This option allows base station 205 more control over which UEs 210 are allowed to overload a given PUCCH resource (e.g., base station 205 may designate two UEs 210 that are far apart in "angles" at the same RSRP level to the same resource in "RSRP threshold-based" PUCCH resource subsets).

As discussed above, in some examples the size (e.g., quantity of resources) of each subset of resources may not be uniform. For example, in an RSRP-threshold based subset of resource determination, more resources (less "resource overloading") may be assigned for subsets of resources with lower values of RSRP, while less resources (more "resource overloading") may be assigned for subsets of resources with larger values of RSRP. The rationale may be that a lower probability of failure in a good RSRP scenario may allow more overloading. One design goal in this approach may be to keep a similar ratio of "UEs per resource" in a probabilistic sense for all resources in the set of resources.

In some aspects, the described techniques may support dynamic and/or semi-static reconfiguration of the subsets of resources. That is, the subsets of resources discussed above may not be fixed, it may instead change (at least slowly). For example, base station 205 may determine that there is too much resource overloading on certain subsets of resources, that certain "coordinates" used to construct the subsets of resources are too congested, and the like. Accordingly, base station 205 may update, reconfigure, or otherwise reallocate more PUCCH resources as needed. In some aspects, this may include base station 205 transmitting a higher layer signal, a DCI, etc., that explicitly and/or implicitly indicates the updated set of resources. These updated set of resources may indicate or otherwise provide a change to the subset of resources associated with each channel metric. That is, one option may include a DCI field that signals changes to the configured subsets of resources. In another option the DCI can point to an MCCH exchange, wherein the MCCH now contains the updated subsets of resource allocations.

Moreover, in some aspects the selected subset of resources may change for a given UE 210, e.g., based on changes to that UE's channel metrics. That is, if there is a change in the UE-specific parameters (e.g., that UE's channel metric) that define the subset of resources that the UE 210 can use, the UE 210 may select an updated subset of resources from the set of resources based on the changed channel metric of the UE 210. In a UE-driven option, the UE 210 may simply transmit its NACK indication using UE-driven subset of resource selection from the set of resources in the new or updated subset of resources to which its belongs after a change in its downlink quality (e.g., based on a change to its channel metric satisfying a threshold). That is, the UE 210 may autonomously select the updated subset of resources based on the changed channel metric of the UE 210. In a base station-driven option, a change in the relevant UE-specific parameters may trigger an uplink signal from the UE 210 to base station 205 (e.g., via distinct unicast resources) to reconfigure it with the PUCCH resource to use within the new subset of resources. That is, the UE 210 may transmit an indication that the channel metric of the UE 210 has changed beyond a threshold and, in response, receive an indication of the updated subset of resources to select based on the indication.

In some aspects, there may be an impact on the physics of PUCCH resource design according to the described techniques. In some examples, the downlink multi-cast or broadcast transmission may be in the form of a single frequency network, e.g., where several base stations cooperatively transmit multi-cast data to UEs 210, while appearing as "one multi-cast cell" to the UEs 210. Even a connected mode UE 210 that is uplink synchronized to a given cell may have, for example, a residual timing advance with respect to other cells comprising the single-frequency network. Residual timing advances may create issues with respect to the orthogonality of PUCCH sequences, e.g., for instance impacting sequences separated by cyclic shifts. Accordingly, PUCCH resources (e.g., the candidate resource(s) within each subset, or some subsets, of resources) configured according to the described techniques may be designed to be robust to residual timing advance, e.g., both within a subset of resources as well as across different subsets of resources. Accordingly, each UE 210 may identify timing advance information associated with its selected subset of resources and apply the timing advance when transmitting a feedback message.

Other approaches may also be utilized to address the impact on the physics of PUCCH resource design according to the described techniques. One approach may include guard symbols in the time domain being configured before and/or after a given candidate resource in each subset of resources. That is, candidate resources in the selected subset of resources may include one or more guard symbols. Another approach may be that, for sequences-based PUCCH, a subset of allowed cyclic shifts (e.g., separated far apart) may be configured. That is, candidate resources in the selected subset of resources may include orthogonal cyclic shifts of a base sequences that are different across different subsets of resources.

How these options are employed may be different across different subsets of resources. For example, for UEs 210 that are closer to base station 205 (e.g., UEs 210 with a high RSRP), the residual timing advance may be small. As a result, more cyclic shifts of base PUCCH sequences may be configured for use. However, for UEs 210 that are further away from base station 205 (e.g., UEs 210 with a low RSRP), fewer (e.g., distant) cyclic shifts may be configurable, fewer guard symbols may be used, and/or a greater degree of FDM may be used for such subsets of resources. Similar to guard symbols in the time domain, guard subcarriers in the frequency domain may be employed across PUCCH resources. This may mitigate against uncompensated residual frequency offsets.

In some aspects, the PUCCH resource allocation (e.g., the set of resources) and determination for NACK-based uplink feedback in response to multi-cast or broadcast transmission according to the described techniques may be applicable for certain duplexing modes (e.g., duplexing configuration) and/or certain types (e.g., formats) of PUCCH transmission. For example, one use case for this may be a TDD mode of operation along with a sequence-based PUCCH transmission. This may provide base station 205 with an "analog" estimate of the spatial directions that are experiencing failure. Utilizing TDD reciprocity, base station 205 can steer the transmissions to these failure coordinates.

Depending on the number of antennas and/or the receive beam direction that the UE 210 uses for receiving the multi-cast or broadcast transmission, the UE 210 may transmit a beamformed or antenna-switched PUCCH (e.g., a beamformed and/or antenna-switched feedback message). In one option, the UE 210 uses the same receive beam as it uses for reception of the multi-cast or broadcast transmission for the transmission of the feedback message. That is, the UE 210 may identify the receive beam used for receiving the multi-cast or broadcast transmission and select the corresponding transmit beam for the feedback message based on the receive beam. Another option may be that specific beamforming features may be ingrained into the definition of certain PUCCH resources. For example, UE 210 may identify a transmit beam associated with the selected subset of resources and use the transmit beam for transmitting the feedback message to base station 205. A third option may be that, for UEs 210 with multiple receive antennas, there may be some PUCCH resources designated for antenna-switched PUCCH transmission (e.g., possibly including an associated antenna-switching pattern). Accordingly, UE 210 may identify an antenna switching configuration associated with the selected subset of resources, and then implement the antenna switching configuration for transmitting the feedback message.

In some aspects, the PUCCH resources may have an associated power control parameter to facilitate signature detection by base station 205. That is, the UE 210 may identify a transmit power control parameter based on its selected subset of resources, and then transmit its feedback message according to the transmit power control parameter.

In some scenarios, UEs 210 may have concurrent unicast and multi-cast receptions from base station 205. There may be instances where (e.g., particularly in TDD scenarios) unicast ACK/NACK (e.g., feedback indication for the unicast transmission) and multi-cast group NACK are to be transmitted simultaneously. In these cases, different options are available to the UEs 210. In one option, UE 210 may simply forego transmitting the multi-cast group NACK. That is, the UE 210 may determine that ACK/NACK information is to be simultaneously transmitted in response to the unicast transmission. In this option, UE 210 may transmit the feedback message indicating the ACK/NACK information for the unicast transmission, but without the feedback indication for the multi-cast or broadcast transmission (e.g., the multi-cast group NACK). In another option, the UE 210 may multiplex the feedback indication for the multi-cast or broadcast transmission (e.g., the multi-cast group NACK) with the ACK/NACK information for the unicast transmission. That is, base station 205 may configure a one-time unicast ACK/NACK for a multi-cast or broadcast transmission, that can be multiplexed with unicast ACK/NACK for the unicast transmission.

Accordingly, UEs 210-b, 210-c, and 210-f may each select a subset of resources from the set of resources based on their own channel metric, and then use at least a portion of the resources within their selected subset of resources for transmitting respective feedback messages to base station 205. The feedback messages may carry or otherwise convey an indication of whether the UE 210 was able to successfully receive and decode the multi-cast or broadcast transmission from base station 205, e.g., the multi-cast group NACK).

Figure 3:
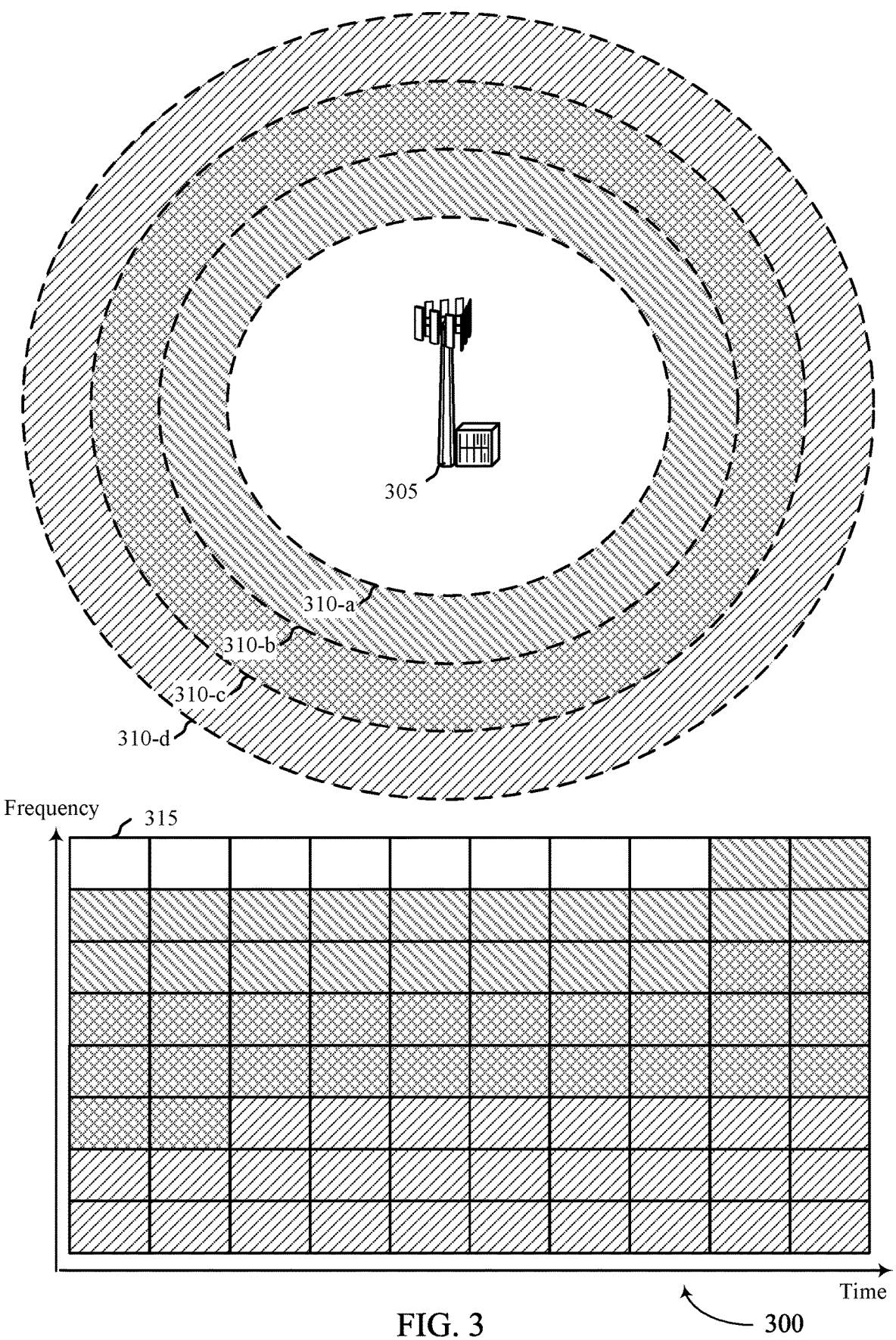
FIG. 3 illustrates an example of a wireless communication system that supports control channel resources for group-feedback in multi-cast in accordance with aspects of the present disclosure.

FIG. 3 illustrates an example of a wireless communication system 300 that supports control channel resources for group-feedback in multi-cast in accordance with aspects of the present disclosure. In some examples, wireless communication system 300 may implement aspects of wireless communication systems 100 and/or 200. Wireless communication system 300 may include base station 305 and a plurality of UEs (not shown), which may be examples of the corresponding devices described herein.

As discussed above, aspects of the described techniques may include base station 305 configuring a plurality of UEs with a set of resources to use for transmission of a feedback message for a multi-cast or broadcast transmission, where the set of resources include a plurality of subsets of resources and each subset of resources is associated with a corresponding channel metric of the UE(s) transmitting the feedback messages. For example, base station 305 may identify or otherwise select the set of resources 315 and configure the UEs with the set of resources 315 via a configuration message (e.g., a higher layer signal, such as an RRC signal, MCCH signal, etc.). Each UE may then determine that a feedback indication (e.g., a NACK indication) is to be provided to base station 305 in response to a multi-cast or broadcast transmission, and then select a subset of resources from the configured set of resources 315 based on its channel metric. That is, each UE having a feedback indication to provide may identify its own channel metric, determine which subset of resources is associated with that channel metric (e.g., is within the range), and then select the subset of resources from the plurality of subsets of resources to use for transmitting a feedback message including the feedback indication. The UE may then to transmit the feedback message to convey the feedback indication to base station 305.

Wireless communication system 300 illustrates one non-limiting example of how the plurality of subsets of resources may be configured according to the described techniques. That is, wireless communication system 300 provides an example illustration of a PUCCH resource allocation according to the described techniques. Broadly, base station 305 has a corresponding coverage area within which it communicates with the plurality of UEs for the multi-cast or broadcast transmission. In the example illustrated in wireless communication system 300, the plurality of coverage areas are denoted as coverage areas 310, with coverage area 310-d being the farthest from base station 305, coverage area 310-c being the next closest coverage area to base station 305, coverage area 310-b being the next closest coverage area, and coverage area 310-c a being the closest coverage area with respect to base station 305. As can be appreciated, the channel metric for UEs located within coverage area 310-d can generally be considered poorer or lower than the channel metric for UEs located within coverage area 310-a. For example, UEs located in coverage area 310-a may have a higher RSRP value or range than UEs located in coverage area 310-b. Similarly, UEs located in coverage area 310-c may have a higher RSRP value or range than UEs located in coverage area 310-d. Although the example illustrated in wireless communication system 300 generally relates to the distance each UE is located from base station 305, it is to be understood that other examples may relate to the direction of such UEs in relation to base station 305, the location of such UEs in relation to an obstructive object within a coverage area 310, and/or channel performance parameters within each coverage area 310, and the like.

Based on the performance differences of the UEs within the respective coverage areas 310, the plurality of subsets of resources may correspond to the different coverage areas 310. That is, also illustrated in FIG. 3 is the set of resources 315 that base station 305 may configure for the UEs associated with the multi-cast or broadcast transmission. The set of resources 315 generally includes resource elements (REs) in the time domain (horizontal axis) and frequency domain (vertical axis). The set of resources 315 are divided into a plurality of subsets of resources, with each subset of resources corresponding to the different coverage areas 310 of base station 305. For example, a first subset of resources may include a quantity of eight REs (shown in clear) that correspond to the coverage area 310-a. That is, UEs located within coverage area 310-a may select the first subset of resources from the set of resources 315 if they are located within coverage area 310-a and/or have a channel metric associated with coverage area 310-a. As another example, a second subset of resources may include a quantity of 20 REs (shown in left-diagonal lines) that correspond to the coverage area 310-b. That is, UEs located within coverage area 310-b may select the second subset of resources from the set of resources 315 if they are located within coverage area 310-b and/or have a channel metric associated with coverage area 310-b. As another example, a third subset of resources may include a quantity of 24 REs (shown in cross-hatched lines) that correspond to the coverage area 310-c. That is, UEs located within coverage area 310-c may select the third subset of resources from the set of resources 315 if they are located within coverage area 310-c and/or have a channel metric associated with coverage area 310-c. As a final example, a fourth subset of resources may include a quantity of 28 REs (shown in right-diagonal lines) that correspond to the coverage area 310-d. That is, UEs located within coverage area 310-d may select the fourth subset of resources from the set of resources 315 if they are located within coverage area 310-d and/or have a channel metric associated with coverage area 310-d.

Accordingly, more resources are allocated to UEs in poor coverage (e.g., coverage area 310-d) than UEs located in good coverage (e.g., coverage area 310-a). This approach may provide improved efficiency in PUCCH resource allocation where group NACK indications are being provided to base station 305. That is, the UEs may select a subset of resources from the set of resources 315 based on their respective channel metric, and then use one or more of the resources (e.g., RE(s)) in the selected subset of resources for transmitting a feedback message to base station 305 in response to a multi-cast or broadcast transmission. As discussed above, the resources within a particular subset of resources (and/or for each subset of resources) may change (e.g., may be updated by base station 305 based on the performance of the configured subset of resources). Moreover, the UEs may autonomously and/or coordinate with base station 305 to update its selected subset of resources (e.g., based on changes to the channel metric of the UE).

Figure 4:
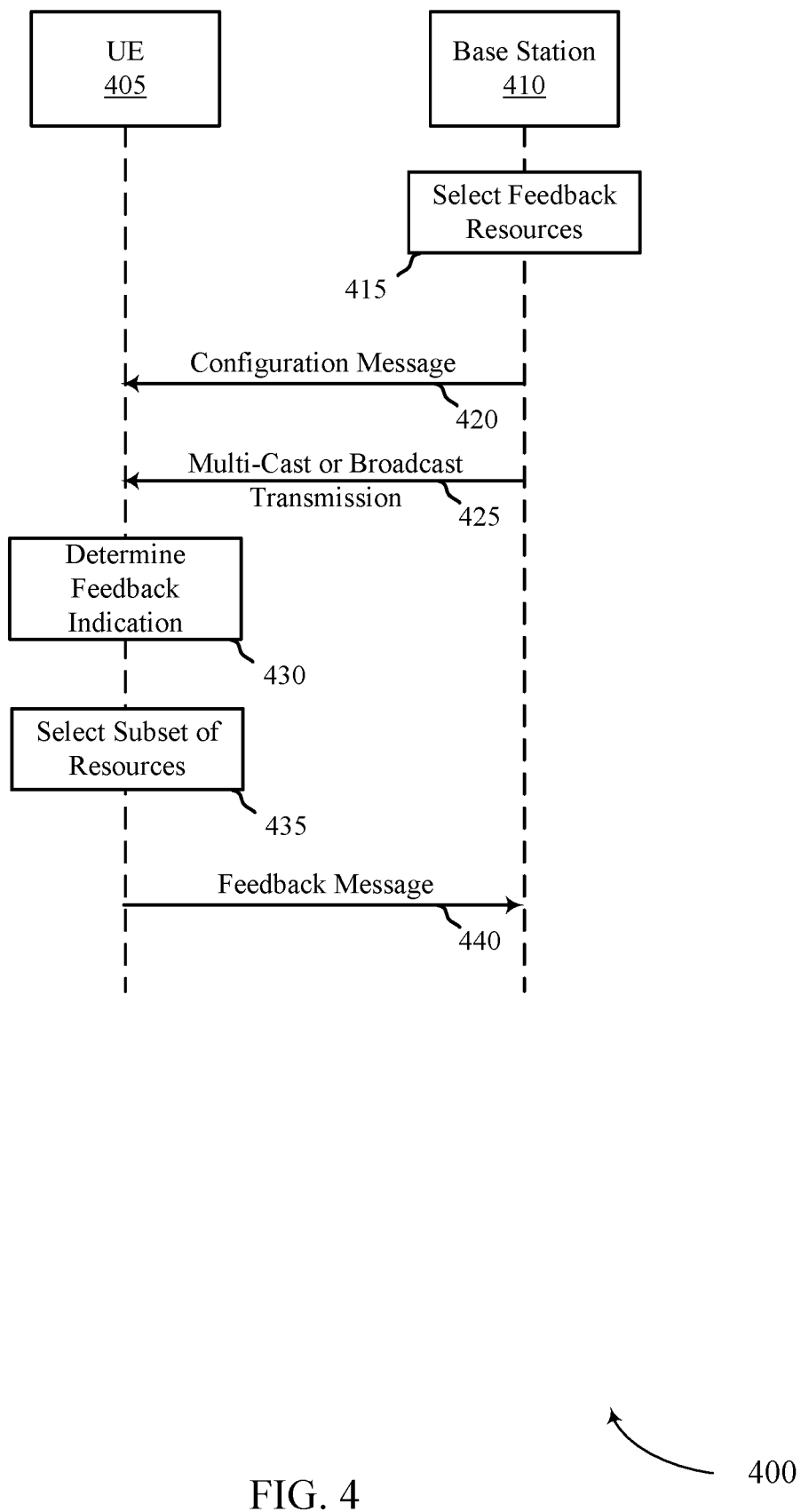
FIG. 4 illustrates an example of a process that supports control channel resources for group-feedback in multi-cast in accordance with aspects of the present disclosure.

FIG. 4 illustrates an example of a process 400 that supports control channel resources for group-feedback in multi-cast in accordance with aspects of the present disclosure. In some examples, process 400 may implement aspects of wireless communication systems 100, 200, and/or 300. Aspects of process 400 may be implemented by UE 405 and/or base station 410, which may be examples of corresponding devices described herein.

At 415, base station 410 may identify or otherwise select a set of resources (e.g., PUCCH resources) available for use by a plurality of UEs (including UE 405) for transmission of feedback indications for a multi-cast or broadcast transmission to the plurality of UEs. The set of resources may include a plurality of subsets of resources, with each subset of resources being associated with a corresponding channel metric for each UE.

In some aspects, the quantity of resources in the first subset of resources may be different from a quantity of resources in the other subsets of resources. For example, each subset of resources may be associated with a different range of channel metrics, with more resources being allocated for UEs having poor channel metrics (e.g., a low RSRP, high interference, edge UEs, etc.) than for UEs having high channel metrics. For example, the channel metric associated with each subset of resources may include an RSRP threshold range. Subsets of resources associated with the higher RSRP threshold range may include a lower quantity of resources that subsets of resources are associated with a lower RSRP threshold range.

At 420, base station 410 may transmit (and UE 405 may receive) a configuration message to the plurality of UEs identifying the set of resources. In some aspects, the configuration message may be a higher layer message, e.g., RRC message, MCCH message, and the like.

At 425, base station 410 may transmit a multi-cast or broadcast transmission to the plurality of UEs. Any multi-UE transmission may be considered the multi-cast or broadcast transmission. That is, any transmission that is for multiple UEs may be considered the multi-cast or broadcast transmission.

At 430, UE 405 may determine that a feedback indication (e.g., a NACK indication) is to be provided to base station 410 in response to the multi-cast or broadcast transmission. That is, UE 405 may determine that it was unable to successfully receive and decode the multi-cast or broadcast transmission from base station 410. Accordingly, UE 405 may determine that it has a NACK indication to transmit to base station 410 in response to the multi-cast or broadcast transmission.

At 435, UE 405 may select, based on a channel metric of UE 405, a first subset of resources from the plurality of subsets of resources to use for transmitting a feedback message including the feedback indication. For example, UE 405 may identify or otherwise determine its channel metric, and then select the first subset of resources (or more simply the subset of resources) from the plurality of subsets of resources based on the channel metric. In some aspects, this may include UE 405 autonomously selecting the first subset of resources. For example, UE 405 may generate a random number based on some UE-specific feature, and then select the resources within the first subset of resources based on the random number.

In some aspects, this may include UE 405 receiving a higher layer signal from base station 410 indicating or otherwise identifying the first subset of resources to select. For example, the higher layer signal may include an RRC signal, MCCH signal, and the like, transmitted from base station 410. The higher layer signal may simply identify the first subset of resources and/or may identify which resources within the first subset of resources that UE 405 is to use for transmitting the feedback message.

In some aspects, the channel metric may include, alone or in any combination, an RSRP, and RSSI, a beamform AoA/AoD, a transmit beam, a receive beam, a geographical location, an interference level, the CSI metric, a throughput level, and the like, for the UEs in the plurality of UEs.

In some aspects, this may include UE 405 determining that its channel metric has changed beyond a threshold. In this situation, UE 405 may, based on the changed channel metric, autonomously and/or via coordination with base station 410 select an updated subset of resources to use for transmitting the feedback message.

In some aspects, the selected first subset of resources may be based on the duplexing configuration of UE 405. That is, different subsets of resources may be based on different duplexing configurations (e.g., TDD vs. FDD). Moreover, configurations for the subsets of resources may be based on the duplexing configuration of UE 405.

At 440, UE 405 may transmit (and base station 410 may receive) a feedback message conveying the feedback indication for the multi-cast or broadcast transmission and using resources from within the selected first subset of resources.

In some aspects, the selected first subset of resources may have a variety of associated features that UE 405 uses for transmitting the feedback message. For example, the candidate resources in the selected first subset of resources may include one or more guard symbols, which are utilized when transmitting the feedback message to base station 410. In another example, candidate resources in the selected first subset of resources may include one or more orthogonal cyclic shifts of a base sequence, which UE 405 may utilize when transmitting the feedback message to base station 410.

In some aspects, UE 405 may identify or otherwise determine a receive beam used for receiving the multi-cast or broadcast transmission from base station 410. UE 405 may select the transmit beam for transmitting the feedback message based on the receive beam. In some aspects, the selected first subset of resources may have an associated transmit beam. Accordingly, UE 405 may identify the transmit beam associated with the selected first subset of resources and use the transmit beam for transmitting the feedback message to base station 410.

In some aspects, the selected first subset of resources may have a corresponding or otherwise associated antenna switching configuration. UE 405 may identify or otherwise determine the antenna switching configuration based on the selected first subset of resources and implement the antenna switching configuration when transmitting the feedback message to base station 410.

In some aspects, the selected first subset of resources may have an associated timing advance information. Accordingly, UE 405 may identify the information associated with the timing advance based on the selected first subset of resources and apply the timing advance and transmitting the feedback message to base station 410.

Figure 5:
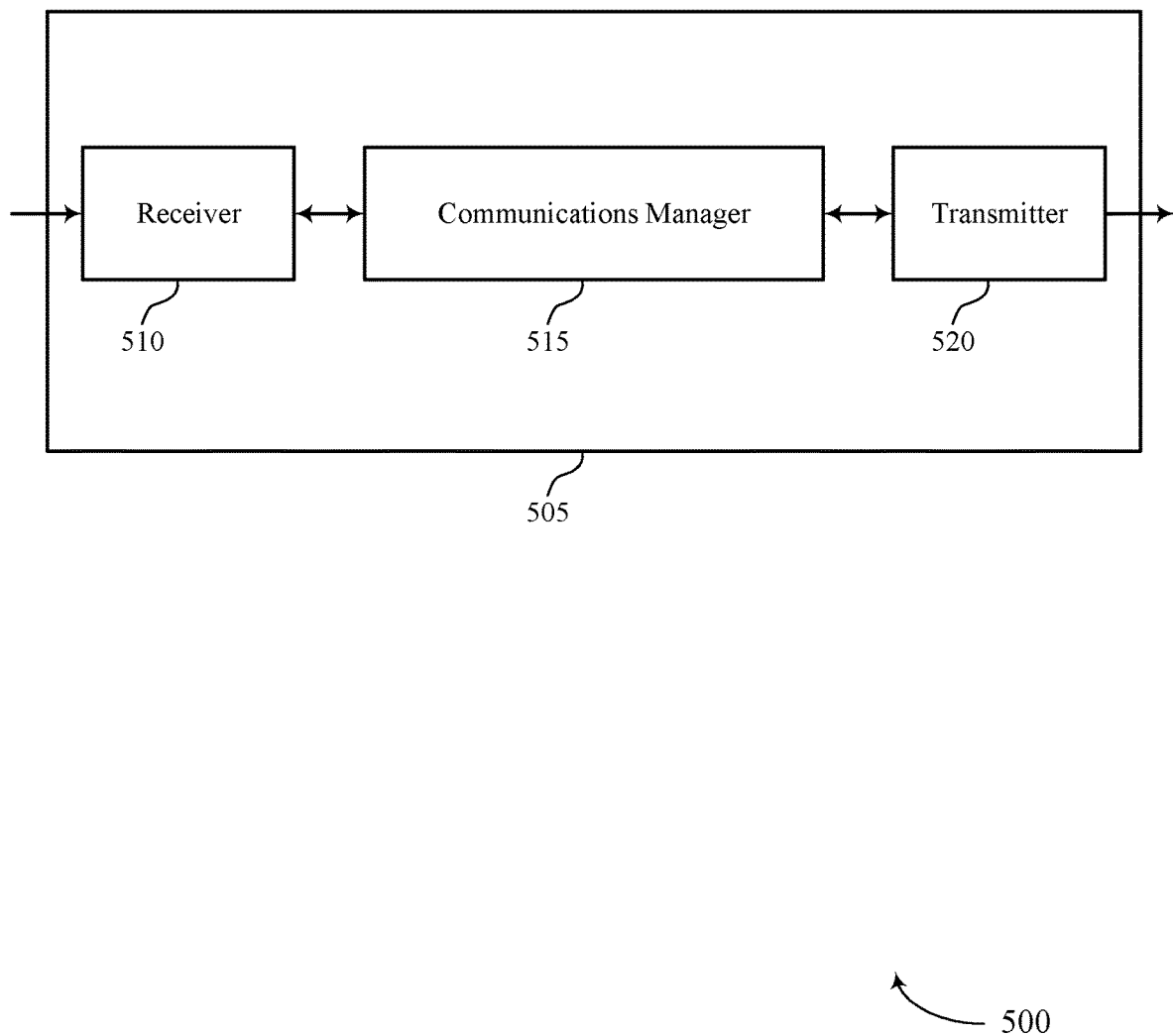
FIGS. 5 and 6 show block diagrams of devices that support control channel resources for group-feedback in multi-cast in accordance with aspects of the present disclosure.

FIG. 5 shows a block diagram 500 of a device 505 that supports control channel resources for group-feedback in multi-cast in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to control channel resources for group-feedback in multi-cast, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, determine that a feedback indication is to be provided in response to the multi-cast or broadcast transmission, select, based on a channel metric of the UE, a first subset of the set of subsets of resources to use for transmitting a feedback message including the feedback indication, and transmit the feedback message for the multi-cast or broadcast transmission using resources within the selected first subset of resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
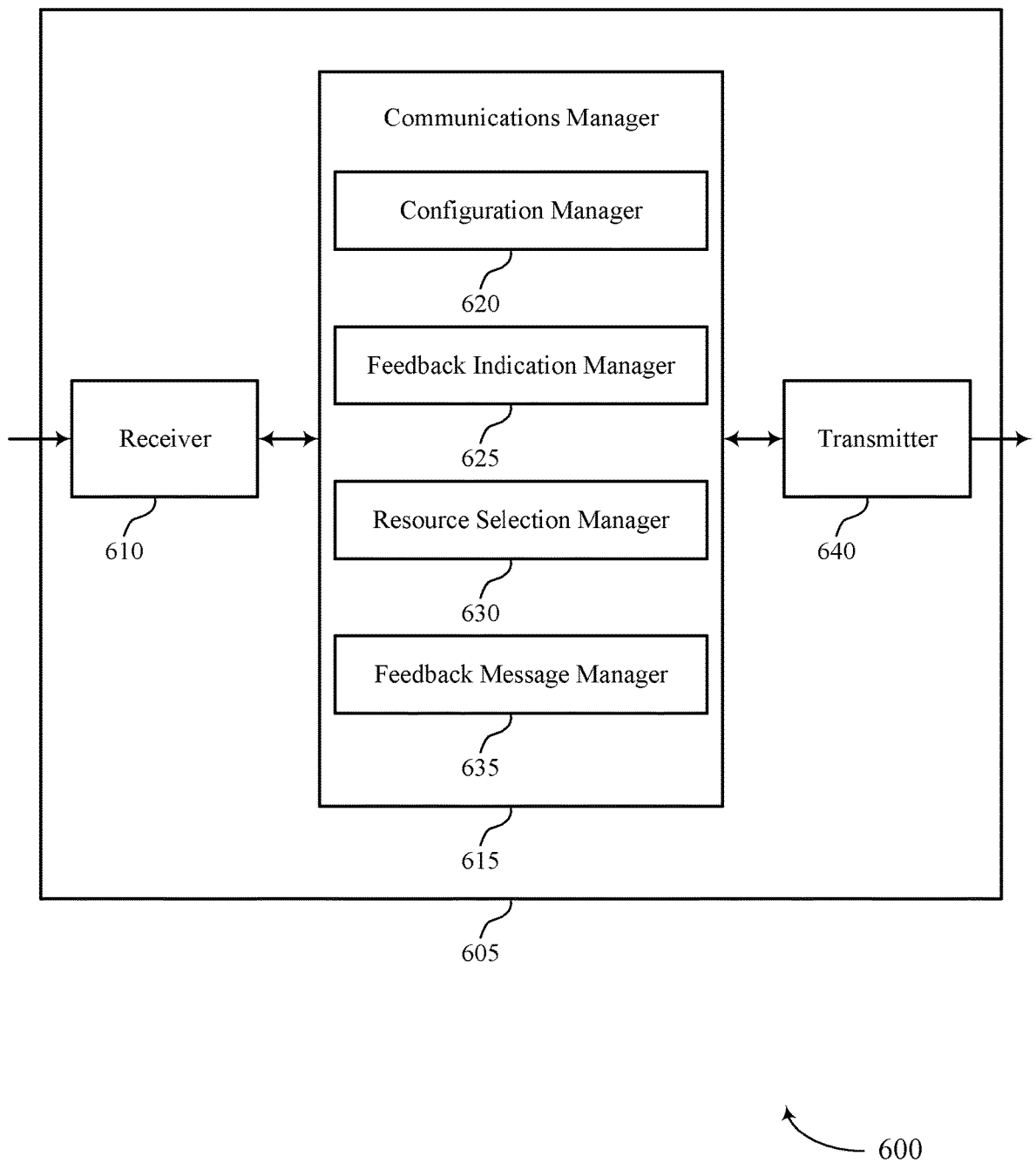

FIG. 6 shows a block diagram 600 of a device 605 that supports control channel resources for group-feedback in multi-cast in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to control channel resources for group-feedback in multi-cast, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a feedback indication manager 625, a resource selection manager 630, and a feedback message manager 635. The communications manager 615 may be an example of aspects of the communications manager 810 described herein.

The configuration manager 620 may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission.

The feedback indication manager 625 may determine that a feedback indication is to be provided in response to the multi-cast or broadcast transmission.

The resource selection manager 630 may select, based on a channel metric of the UE, a first subset of the set of subsets of resources to use for transmitting a feedback message including the feedback indication.

The feedback message manager 635 may transmit the feedback message for the multi-cast or broadcast transmission using resources within the selected first subset of resources.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
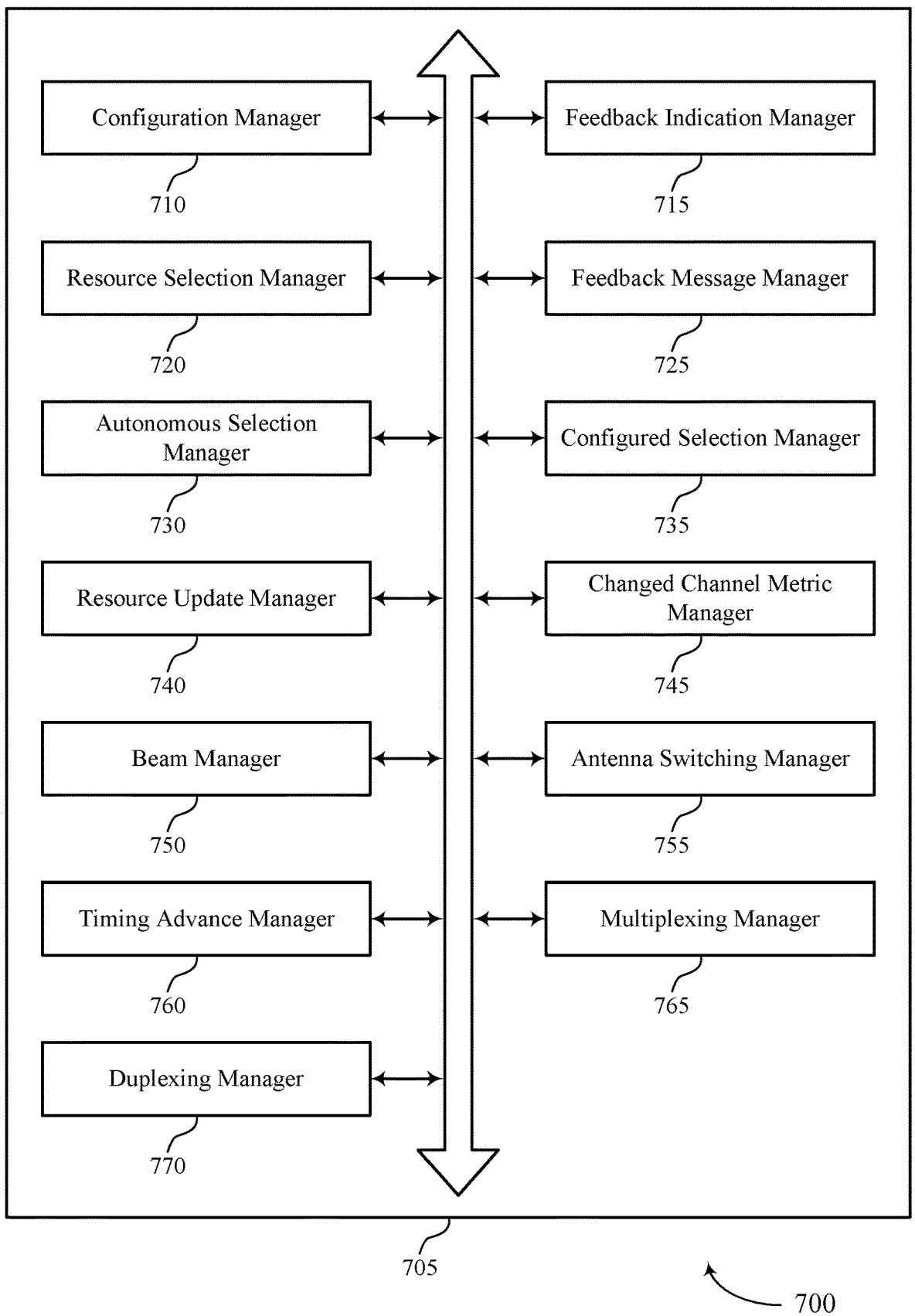
FIG. 7 shows a block diagram of a communications manager that supports control channel resources for group-feedback in multi-cast in accordance with aspects of the present disclosure.

FIG. 7 shows a block diagram 700 of a communications manager 705 that supports control channel resources for group-feedback in multi-cast in accordance with aspects of the present disclosure. The communications manager 705 may be an example of aspects of a communications manager 515, a communications manager 615, or a communications manager 810 described herein. The communications manager 705 may include a configuration manager 710, a feedback indication manager 715, a resource selection manager 720, a feedback message manager 725, an autonomous selection manager 730, a configured selection manager 735, a resource update manager 740, a changed channel metric manager 745, a beam manager 750, an antenna switching manager 755, a timing advance manager 760, a multiplexing manager 765, and a duplexing manager 770. Each of these modules may communicate, directly or indirectly, with one another (e.g., via one or more buses).

The configuration manager 710 may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. In some cases, the configuration message includes a MCCH message. In some cases, the resources in the set of resources include at least one of a frequency resource, or a time resource, or a sequence, or a spatial resource, or any combination thereof.

The feedback indication manager 715 may determine that a feedback indication is to be provided in response to the multi-cast or broadcast transmission.

The resource selection manager 720 may select, based on a channel metric of the UE, a first subset of the set of subsets of resources to use for transmitting a feedback message including the feedback indication. In some examples, the resource selection manager 720 may candidate resources in the first subset of resources include one or more guard symbols. In some examples, the resource selection manager 720 may candidate resources in the first subset of resources include one or more orthogonal cyclic shifts of a base sequence that are different from orthogonal cyclic shifts associated with different subsets of resources of the set of subsets of resources. In some examples, the resource selection manager 720 may subsets of resources associated with a higher RSRP threshold range include a lower quantity of resources than subsets of resources associated with a lower RSRP threshold range.

In some cases, a quantity of resources in the first subset of resources is different from quantities of resources in one or more other subsets of resources of the set of subsets of resources. In some cases, each subset of resources is associated with a different range of channel metrics for the set of UEs. In some cases, the channel metric associated with each subset of resources includes a RSRP threshold range. In some cases, the channel metric includes at least one of a RSRP, or a RSSI, or a beamform angle-of-arrival, or a beamform angle-of-departure, or a transmit beam, or a receive beam, or a geographical location, or an interference level, or a CSI metric, or a throughput level, or any combination thereof.

The feedback message manager 725 may transmit the feedback message for the multi-cast or broadcast transmission using resources within the selected first subset of resources. In some cases, the feedback indication includes a negative-acknowledgement indication.

The autonomous selection manager 730 may autonomously select the first subset of resources to use based on the channel metric. In some examples, the autonomous selection manager 730 may generate a random number based on a UE-specific feature. In some examples, the autonomous selection manager 730 may select one or more resources within the first subset of resources based on the random number.

The configured selection manager 735 may receive a higher layer signal indicating the first subset of resources to select. In some cases, the higher layer signal indicates at least a portion of the resources in the first subset of resources to select. In some cases, the higher layer signal includes at least one of an RRC signal, a MCCH signal, or a combination thereof.

The resource update manager 740 may receive at least one of a higher layer signal, a downlink control information, or a combination thereof, either explicitly or implicitly indicating an updated set of resources, the updated set of resources including a change to the subset of resources associated with each channel metric.

The changed channel metric manager 745 may determine that the channel metric of the UE has changed beyond a threshold. In some examples, the changed channel metric manager 745 may select an updated subset of resources from the set of resources based on the changed channel metric of the UE. In some examples, the changed channel metric manager 745 may autonomously select the updated subset of resources based on the changed channel metric of the UE. In some examples, the changed channel metric manager 745 may transmit an indication that the channel metric of the UE has changed beyond the threshold. In some examples, the changed channel metric manager 745 may receive an indication of the updated subset of resources to select based on the indication that the channel metric of the UE has changed beyond the threshold.

The beam manager 750 may identify a receive beam used for the multi-cast or broadcast transmission. In some examples, the beam manager 750 may select a transmit beam for transmitting the feedback message based on the receive beam. In some examples, the beam manager 750 may identify a transmit beam associated with the selected first subset of resources. In some examples, the beam manager 750 may use the transmit beam for transmitting the feedback message based on the selected first subset of resources.

The antenna switching manager 755 may identify an antenna switching configuration associated with the selected first subset of resources. In some examples, the antenna switching manager 755 may implement the antenna switching configuration for transmitting the feedback message.

The timing advance manager 760 may identify information associated with a timing advance associated with the selected first subset of resources. In some examples, the timing advance manager 760 may apply the timing advance in transmitting the feedback message based on the information.

The multiplexing manager 765 may determine that acknowledgement/negative-acknowledgement information is to be simultaneously transmitted in response to a unicast transmission. In some examples, the multiplexing manager 765 may transmit the feedback message indicating the acknowledgement/negative-acknowledgement information and without the feedback indication. In some examples, the multiplexing manager 765 may determine that acknowledgement/negative-acknowledgement information is to be transmitted in response to a unicast transmission. In some examples, the multiplexing manager 765 may multiplex the feedback indication with the acknowledgement/negative-acknowledgement information for the unicast transmission.

The duplexing manager 770 may identify a duplexing configuration of the UE, where selecting the first subset of resources is based on the duplexing configuration.

Figure 8:
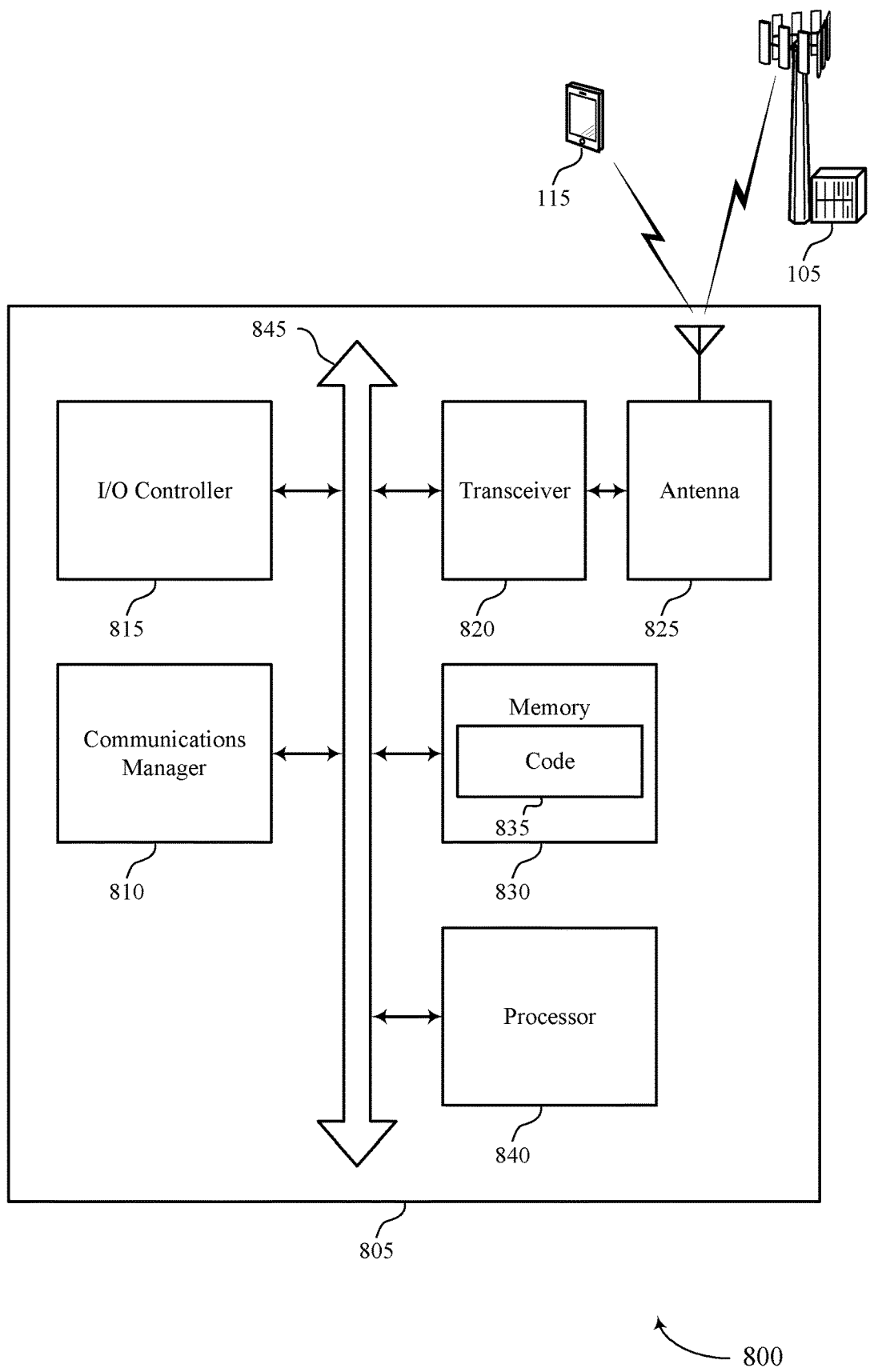
FIG. 8 shows a diagram of a system including a device that supports control channel resources for group-feedback in multi-cast in accordance with aspects of the present disclosure.

FIG. 8 shows a diagram of a system 800 including a device 805 that supports control channel resources for group-feedback in multi-cast in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, determine that a feedback indication is to be provided in response to the multi-cast or broadcast transmission, select, based on a channel metric of the UE, a first subset of the set of subsets of resources to use for transmitting a feedback message including the feedback indication, and transmit the feedback message for the multi-cast or broadcast transmission using resources within the selected first subset of resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting control channel resources for group-feedback in multi-cast).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
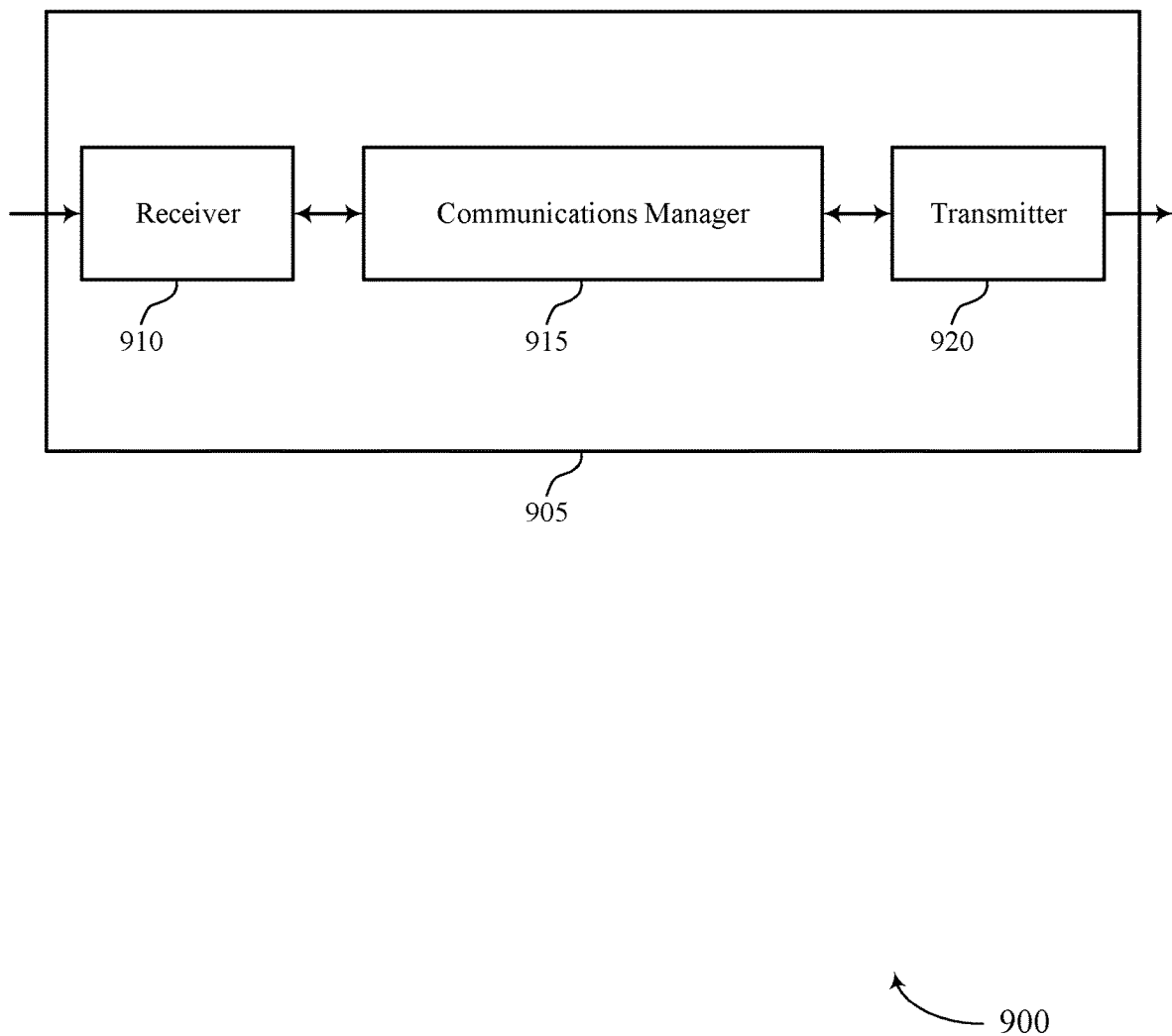
FIGS. 9 and 10 show block diagrams of devices that support control channel resources for group-feedback in multi-cast in accordance with aspects of the present disclosure.

FIG. 9 shows a block diagram 900 of a device 905 that supports control channel resources for group-feedback in multi-cast in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to control channel resources for group-feedback in multi-cast, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, transmit a configuration message to the set of UEs identifying the set of resources, transmit the multi-cast or broadcast transmission to the set of UEs, and receive, from each of one or more UE in the set of UEs, a feedback message indicating the feedback for the multi-cast or broadcast transmission using resources within at least a first subset of resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
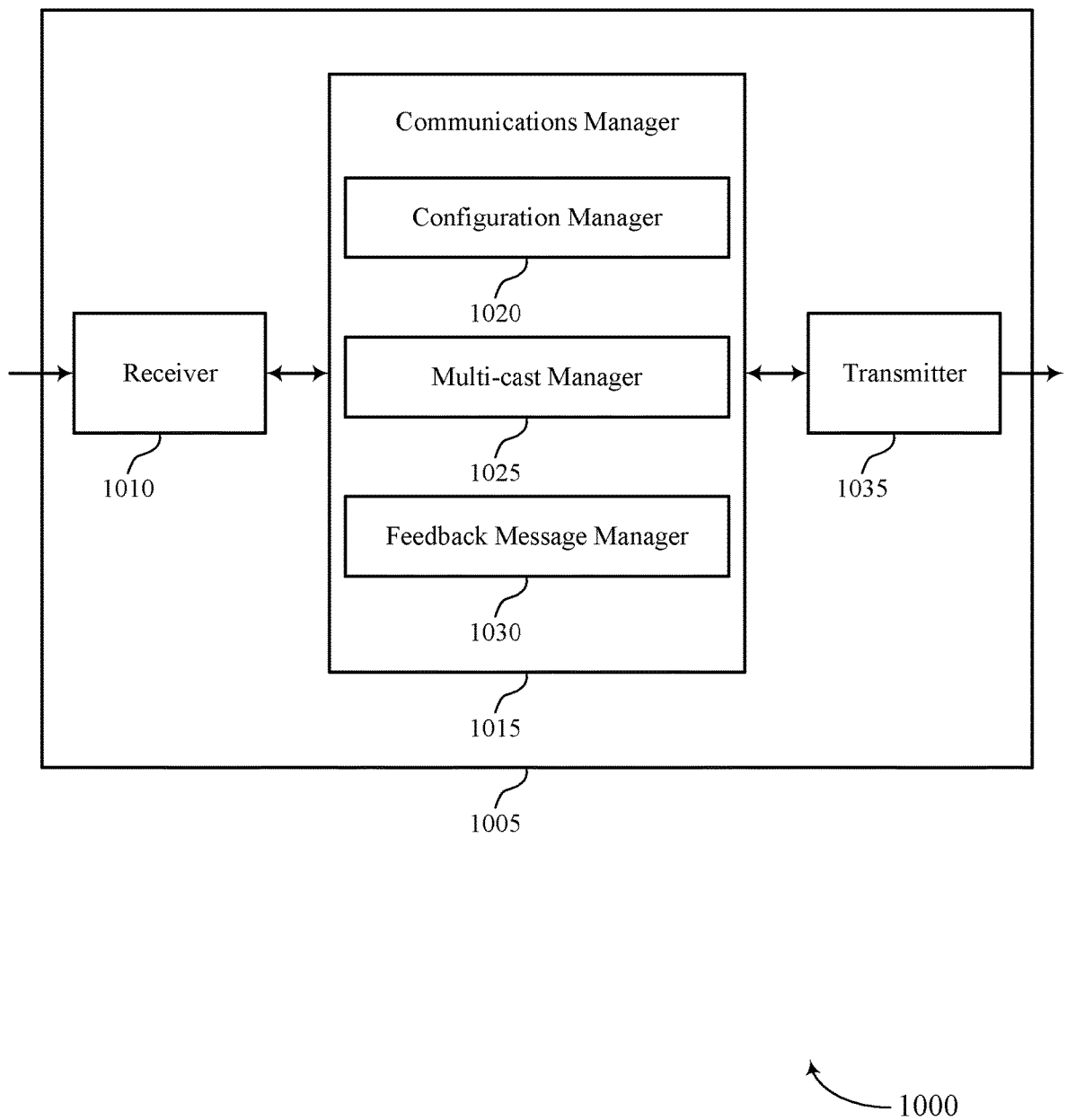

FIG. 10 shows a block diagram 1000 of a device 1005 that supports control channel resources for group-feedback in multi-cast in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to control channel resources for group-feedback in multi-cast, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a multi-cast manager 1025, and a feedback message manager 1030. The communications manager 1015 may be an example of aspects of the communications manager 1210 described herein.

The configuration manager 1020 may select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission and transmit a configuration message to the set of UEs identifying the set of resources.

The multi-cast manager 1025 may transmit the multi-cast or broadcast transmission to the set of UEs.

The feedback message manager 1030 may receive, from each of one or more UE in the set of UEs, a feedback message indicating the feedback for the multi-cast or broadcast transmission using resources within at least a first subset of resources.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
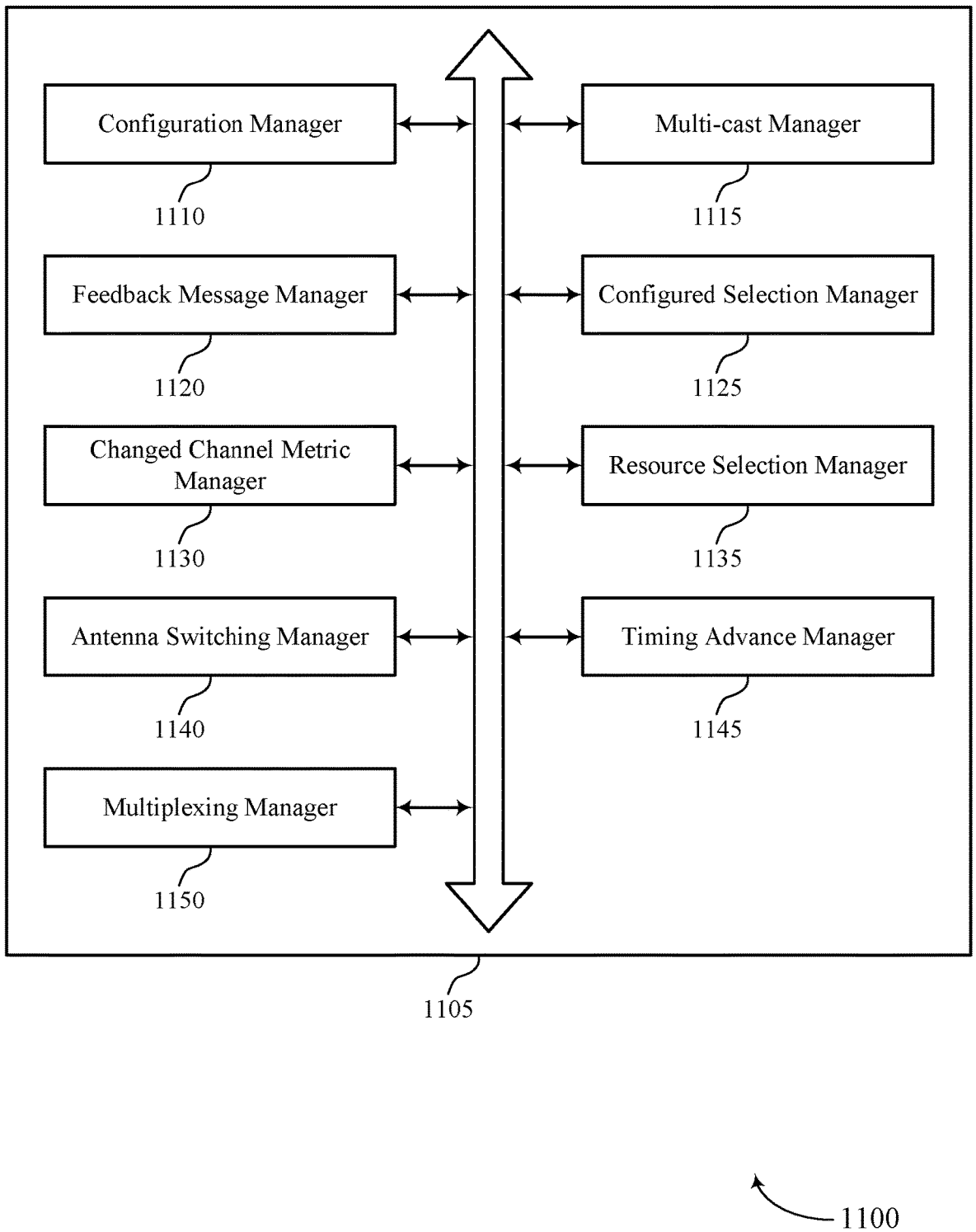
FIG. 11 shows a block diagram of a communications manager that supports control channel resources for group-feedback in multi-cast in accordance with aspects of the present disclosure.

FIG. 11 shows a block diagram 1100 of a communications manager 1105 that supports control channel resources for group-feedback in multi-cast in accordance with aspects of the present disclosure. The communications manager 1105 may be an example of aspects of a communications manager 915, a communications manager 1015, or a communications manager 1210 described herein. The communications manager 1105 may include a configuration manager 1110, a multi-cast manager 1115, a feedback message manager 1120, a configured selection manager 1125, a changed channel metric manager 1130, a resource selection manager 1135, an antenna switching manager 1140, a timing advance manager 1145, and a multiplexing manager 1150. Each of these modules may communicate, directly or indirectly, with one another (e.g., via one or more buses).

The configuration manager 1110 may select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. In some examples, the configuration manager 1110 may transmit a configuration message to the set of UEs identifying the set of resources. In some cases, a quantity of resources in the first subset of resources is different from quantities of resources in one or more other subsets of resources of the set of subsets of resources. In some cases, each subset of resources is associated with a different range of channel metrics for the set of UEs.

In some cases, the channel metric includes at least one of a RSRP, or a RSSI, or a beamform angle-of-arrival, or a beamform angle-of-departure, or a transmit beam, or a receive beam, or a geographical location, or an interference level, or a CSI metric, or a throughput level, or any combination thereof. In some cases, the configuration message includes a MCCH message. In some cases, the resources in the set of resources include at least one of a frequency resource, or a time resource, or a sequence, or a spatial resource, or any combination thereof.

The multi-cast manager 1115 may transmit the multi-cast or broadcast transmission to the set of UEs.

The feedback message manager 1120 may receive, from each of one or more UE in the set of UEs, a feedback message indicating the feedback for the multi-cast or broadcast transmission using resources within at least a first subset of resources. In some cases, each feedback message is received using a UE transmit beam that is selected based on a receive beam that each UE uses to receive the multi-cast or broadcast transmission. In some cases, each feedback message is received using a UE transmit beam that is selected based on a transmit beam associated with the subset of resources that the UE selects. In some cases, the feedback indication includes a negative-acknowledgement indication.

The configured selection manager 1125 may transmit a higher layer signal indicating the first subset of resources for the UE to select. In some cases, the higher layer signal indicates at least a portion of the resources in the first subset of resources for the UE to select. In some cases, the higher layer signal includes at least one of an RRC signal, a MCCH signal, or a combination thereof.

The changed channel metric manager 1130 may transmit at least one of a higher layer signal, a downlink control information, or a combination thereof, either explicitly or implicitly indicating an updated set of resources, the updated set of resources including a change to the subset of resources associated with each channel metric. In some examples, the changed channel metric manager 1130 may receive an indication that the channel metric of at least one UE has changed beyond a threshold. In some examples, the changed channel metric manager 1130 may select an updated subset of resources from the set of resources based on the changed channel metric of the at least one UE. In some examples, the changed channel metric manager 1130 may transmit an indication of the updated subset of resources to select to the at least one UE. In some examples, the changed channel metric manager 1130 may subsets of resources associated with a higher RSRP threshold range include a lower quantity of resources than subsets of resources associated with a lower RSRP threshold range. In some cases, the channel metric associated with each subset of resources includes a RSRP threshold range.

The resource selection manager 1135 may candidate resources in the first subset of resources include one or more guard symbols. In some examples, the resource selection manager 1135 may candidate resources in the first subset of resources include one or more orthogonal cyclic shifts of a base sequence that are different from orthogonal cyclic shifts associated with different subsets of resources of the set of subsets of resources.

The antenna switching manager 1140 may receive the feedback message according to an antenna switching configuration associated with the subset of resources that the UE selects.

The timing advance manager 1145 may receive the feedback message according to a timing advance associated with the subset of resources that the UE selects.

The multiplexing manager 1150 may determine that acknowledgement/negative-acknowledgement information is to be simultaneously received in response to a unicast transmission. In some examples, the multiplexing manager 1150 may receive the feedback message indicating the acknowledgement/negative-acknowledgement information and without the feedback indication. In some examples, the multiplexing manager 1150 may determine that acknowledgement/negative-acknowledgement information is to be received in response to a unicast transmission. In some examples, the multiplexing manager 1150 may receive the feedback indication multiplexed with the acknowledgement/negative-acknowledgement information for the unicast transmission.

Figure 12:
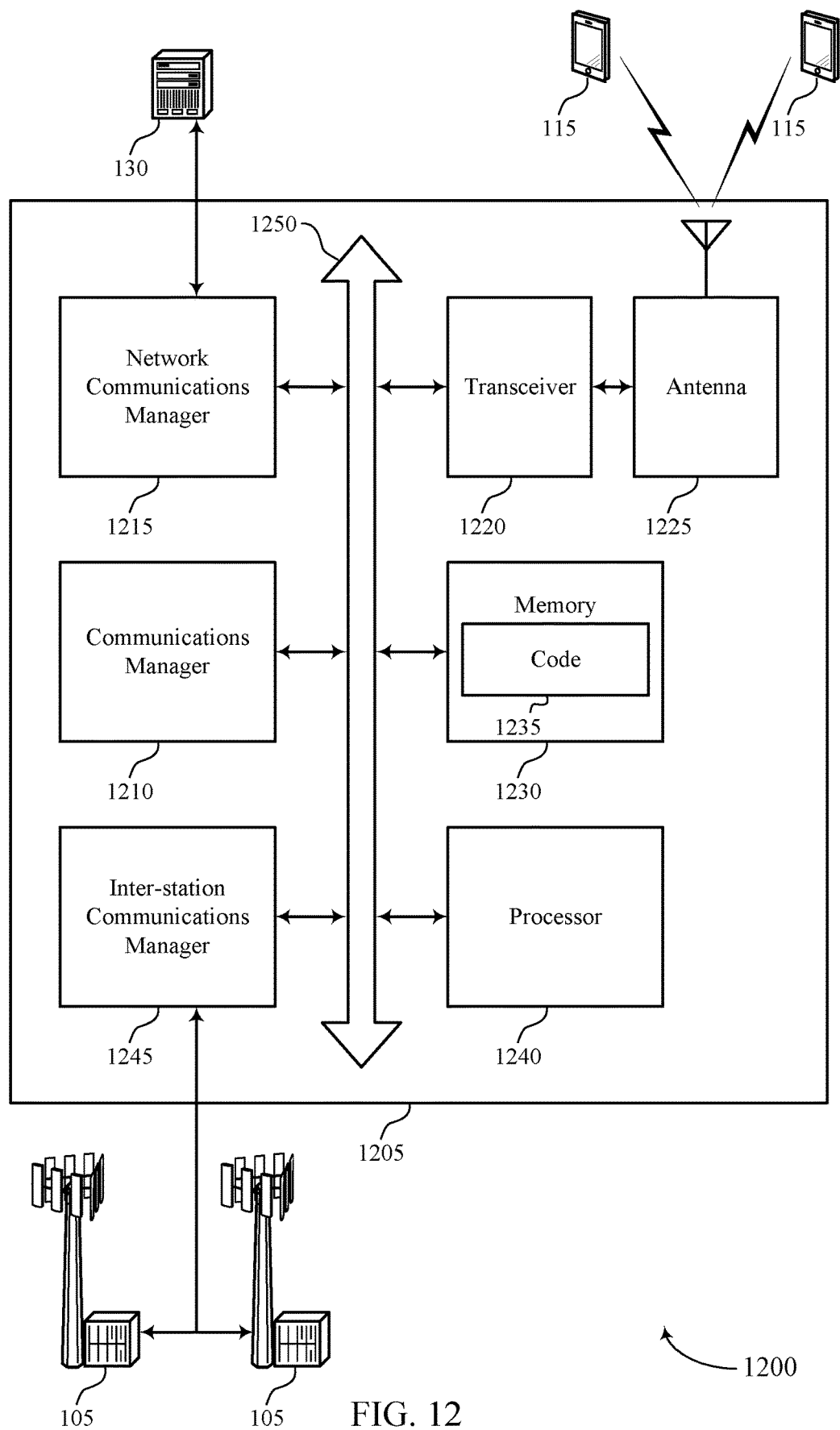
FIG. 12 shows a diagram of a system including a device that supports control channel resources for group-feedback in multi-cast in accordance with aspects of the present disclosure.

FIG. 12 shows a diagram of a system 1200 including a device 1205 that supports control channel resources for group-feedback in multi-cast in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission, transmit a configuration message to the set of UEs identifying the set of resources, transmit the multi-cast or broadcast transmission to the set of UEs, and receive, from each of one or more UE in the set of UEs, a feedback message indicating the feedback for the multi-cast or broadcast transmission using resources within at least a first subset of resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting control channel resources for group-feedback in multi-cast).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
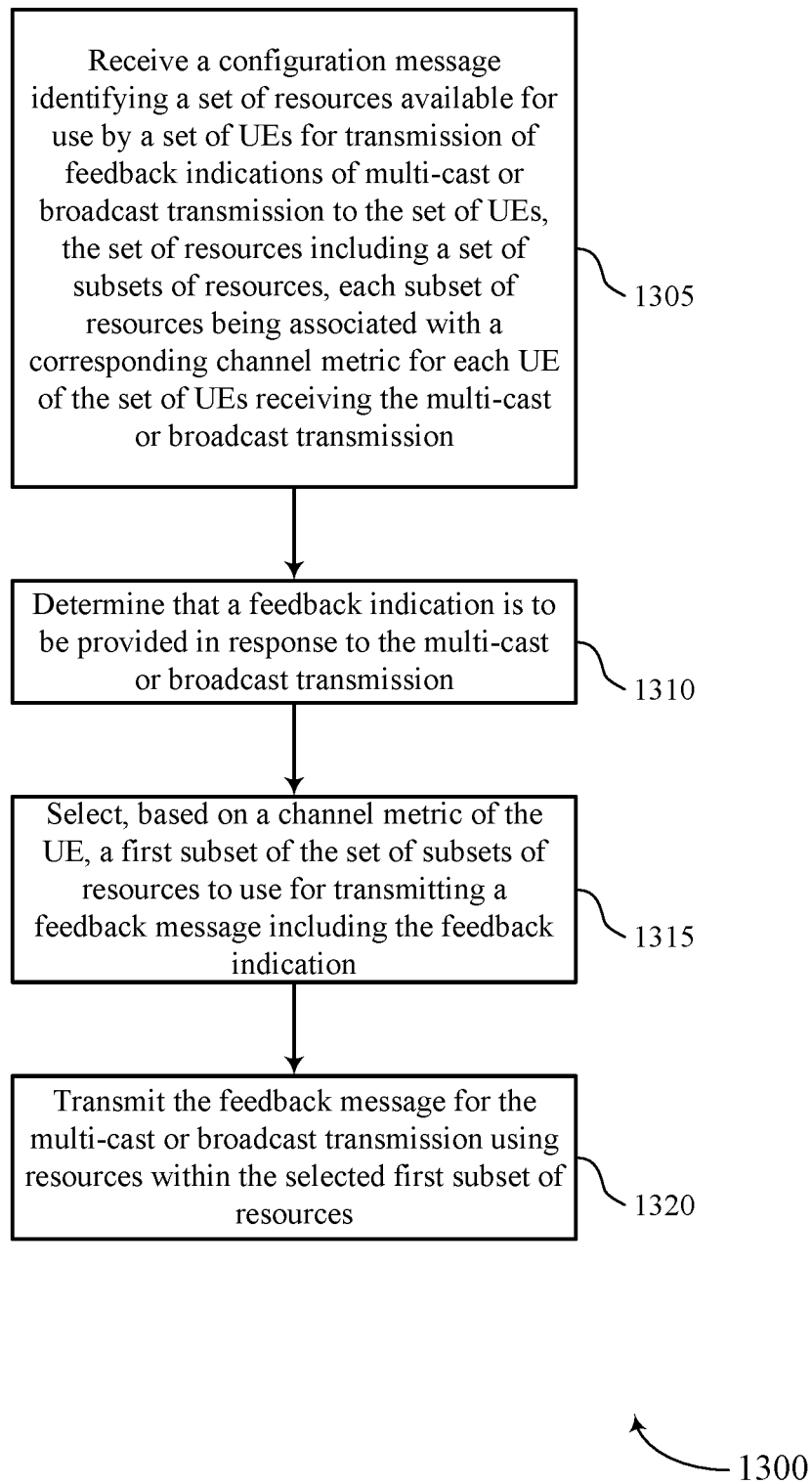
FIGS. 13 through 17 show flowcharts illustrating methods that support control channel resources for group-feedback in multi-cast in accordance with aspects of the present disclosure.

FIG. 13 shows a flowchart illustrating a method 1300 that supports control channel resources for group-feedback in multi-cast in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. The operations of 1305 may be performed according to the methods described herein. In some examples, aspects of the operations of 1305 may be performed by a configuration manager as described with reference to FIGS. 5 through 8.

At 1310, the UE may determine that a feedback indication is to be provided in response to the multi-cast or broadcast transmission. The operations of 1310 may be performed according to the methods described herein. In some examples, aspects of the operations of 1310 may be performed by a feedback indication manager as described with reference to FIGS. 5 through 8.

At 1315, the UE may select, based on a channel metric of the UE, a first subset of the set of subsets of resources to use for transmitting a feedback message including the feedback indication. The operations of 1315 may be performed according to the methods described herein. In some examples, aspects of the operations of 1315 may be performed by a resource selection manager as described with reference to FIGS. 5 through 8.

At 1320, the UE may transmit the feedback message for the multi-cast or broadcast transmission using resources within the selected first subset of resources. The operations of 1320 may be performed according to the methods described herein. In some examples, aspects of the operations of 1320 may be performed by a feedback message manager as described with reference to FIGS. 5 through 8.

Figure 14:
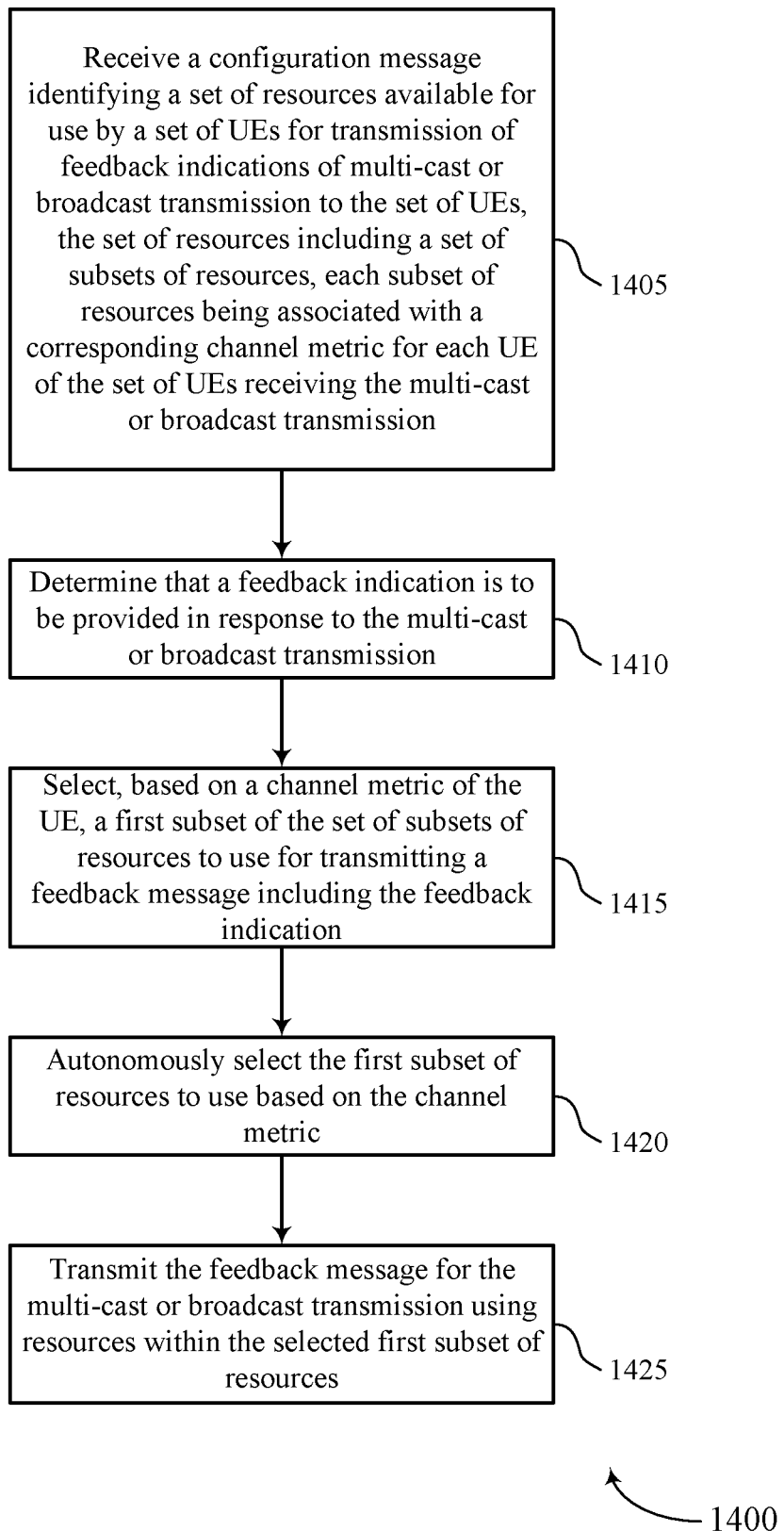

FIG. 14 shows a flowchart illustrating a method 1400 that supports control channel resources for group-feedback in multi-cast in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1405, the UE may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. The operations of 1405 may be performed according to the methods described herein. In some examples, aspects of the operations of 1405 may be performed by a configuration manager as described with reference to FIGS. 5 through 8.

At 1410, the UE may determine that a feedback indication is to be provided in response to the multi-cast or broadcast transmission. The operations of 1410 may be performed according to the methods described herein. In some examples, aspects of the operations of 1410 may be performed by a feedback indication manager as described with reference to FIGS. 5 through 8.

At 1415, the UE may select, based on a channel metric of the UE, a first subset of the set of subsets of resources to use for transmitting a feedback message including the feedback indication. The operations of 1415 may be performed according to the methods described herein. In some examples, aspects of the operations of 1415 may be performed by a resource selection manager as described with reference to FIGS. 5 through 8.

At 1420, the UE may autonomously select the first subset of resources to use based on the channel metric. The operations of 1420 may be performed according to the methods described herein. In some examples, aspects of the operations of 1420 may be performed by an autonomous selection manager as described with reference to FIGS. 5 through 8.

At 1425, the UE may transmit the feedback message for the multi-cast or broadcast transmission using resources within the selected first subset of resources. The operations of 1425 may be performed according to the methods described herein. In some examples, aspects of the operations of 1425 may be performed by a feedback message manager as described with reference to FIGS. 5 through 8.

Figure 15:
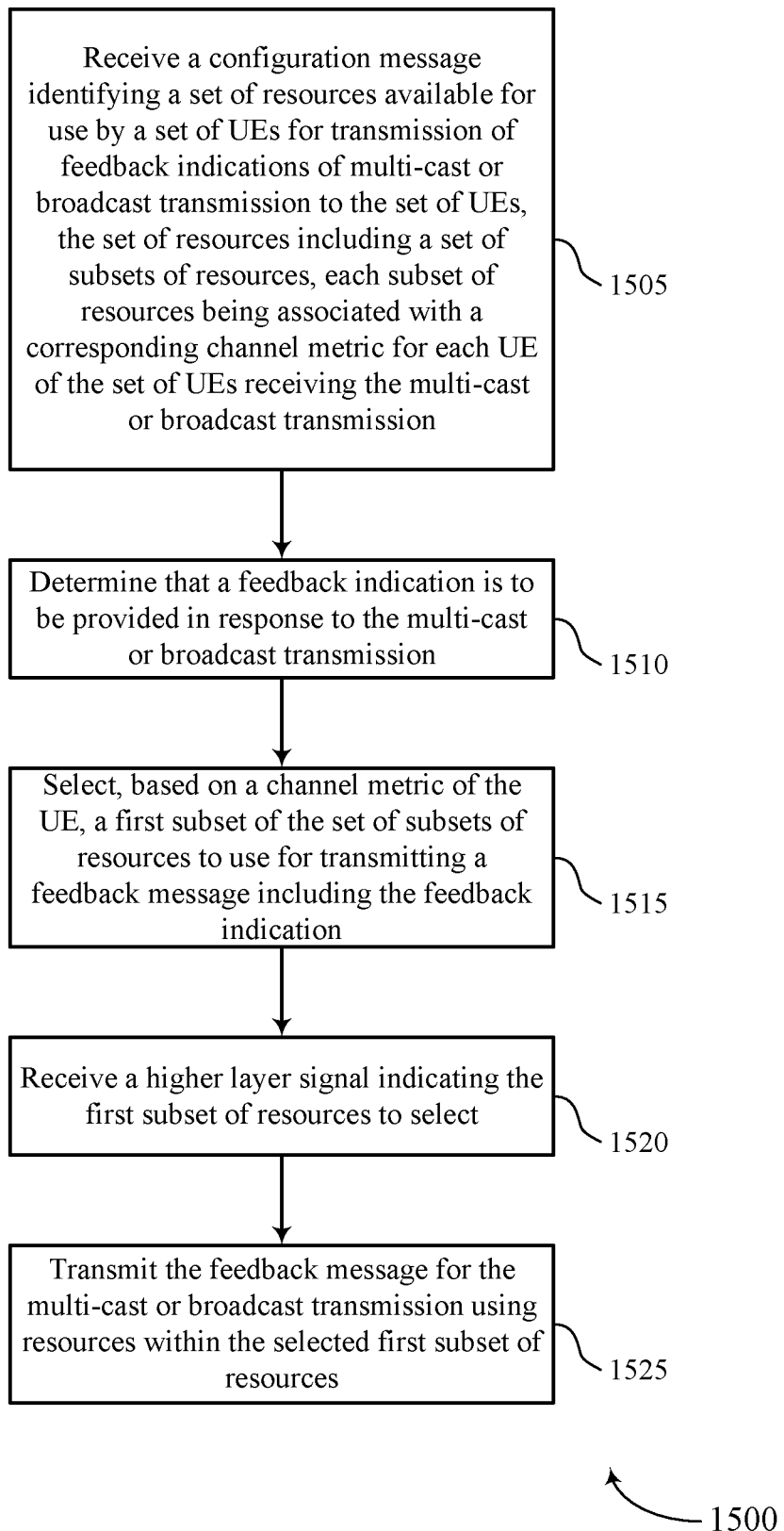

FIG. 15 shows a flowchart illustrating a method 1500 that supports control channel resources for group-feedback in multi-cast in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1505, the UE may receive a configuration message identifying a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. The operations of 1505 may be performed according to the methods described herein. In some examples, aspects of the operations of 1505 may be performed by a configuration manager as described with reference to FIGS. 5 through 8.

At 1510, the UE may determine that a feedback indication is to be provided in response to the multi-cast or broadcast transmission. The operations of 1510 may be performed according to the methods described herein. In some examples, aspects of the operations of 1510 may be performed by a feedback indication manager as described with reference to FIGS. 5 through 8.

At 1515, the UE may select, based on a channel metric of the UE, a first subset of the set of subsets of resources to use for transmitting a feedback message including the feedback indication. The operations of 1515 may be performed according to the methods described herein. In some examples, aspects of the operations of 1515 may be performed by a resource selection manager as described with reference to FIGS. 5 through 8.

At 1520, the UE may receive a higher layer signal indicating the first subset of resources to select. The operations of 1520 may be performed according to the methods described herein. In some examples, aspects of the operations of 1520 may be performed by a configured selection manager as described with reference to FIGS. 5 through 8.

At 1525, the UE may transmit the feedback message for the multi-cast or broadcast transmission using resources within the selected first subset of resources. The operations of 1525 may be performed according to the methods described herein. In some examples, aspects of the operations of 1525 may be performed by a feedback message manager as described with reference to FIGS. 5 through 8.

Figure 16:
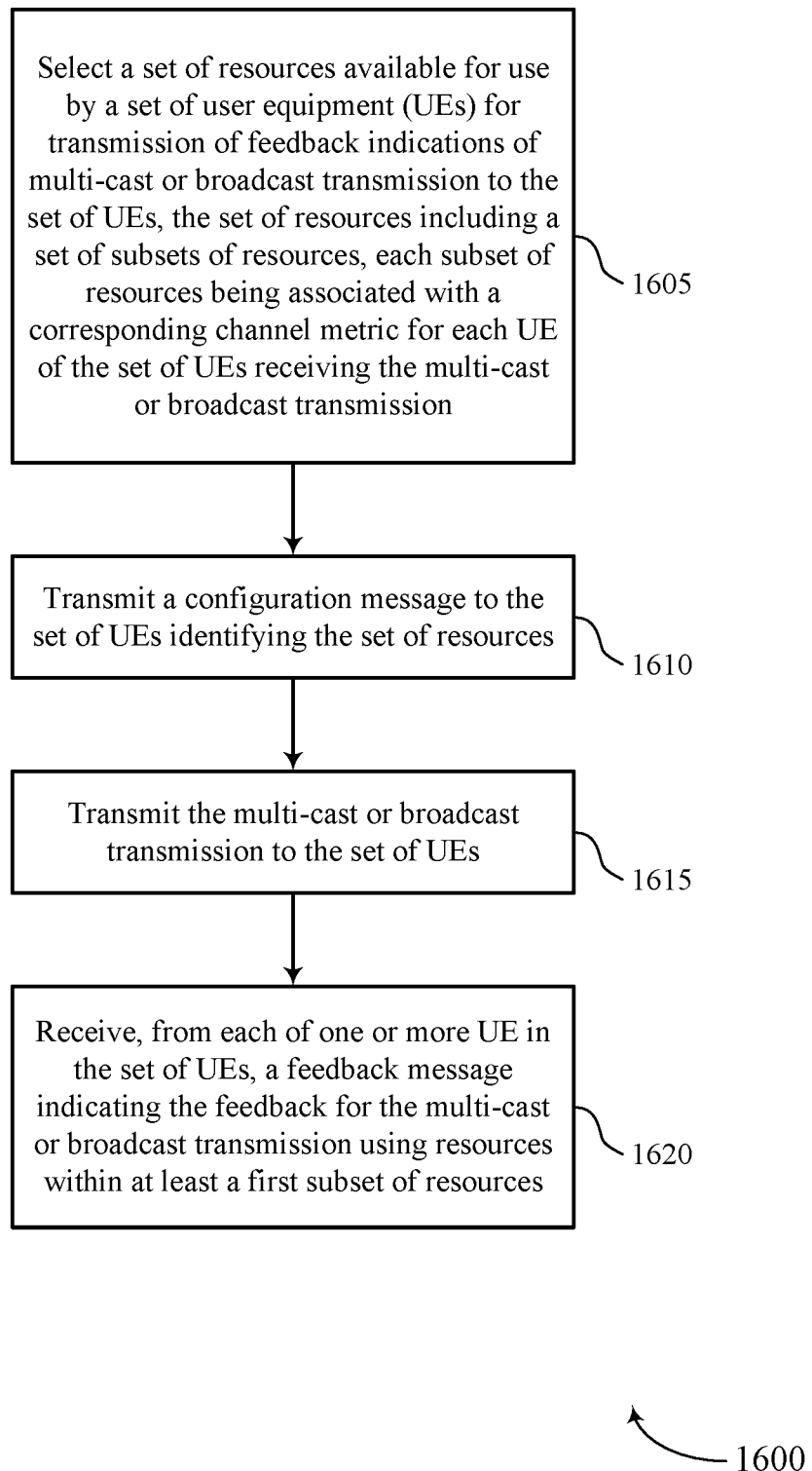

FIG. 16 shows a flowchart illustrating a method 1600 that supports control channel resources for group-feedback in multi-cast in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1605, the base station may select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. The operations of 1605 may be performed according to the methods described herein. In some examples, aspects of the operations of 1605 may be performed by a configuration manager as described with reference to FIGS. 9 through 12.

At 1610, the base station may transmit a configuration message to the set of UEs identifying the set of resources. The operations of 1610 may be performed according to the methods described herein. In some examples, aspects of the operations of 1610 may be performed by a configuration manager as described with reference to FIGS. 9 through 12.

At 1615, the base station may transmit the multi-cast or broadcast transmission to the set of UEs. The operations of 1615 may be performed according to the methods described herein. In some examples, aspects of the operations of 1615 may be performed by a multi-cast manager as described with reference to FIGS. 9 through 12.

At 1620, the base station may receive, from each of one or more UE in the set of UEs, a feedback message indicating the feedback for the multi-cast or broadcast transmission using resources within at least a first subset of resources. The operations of 1620 may be performed according to the methods described herein. In some examples, aspects of the operations of 1620 may be performed by a feedback message manager as described with reference to FIGS. 9 through 12.

Figure 17:
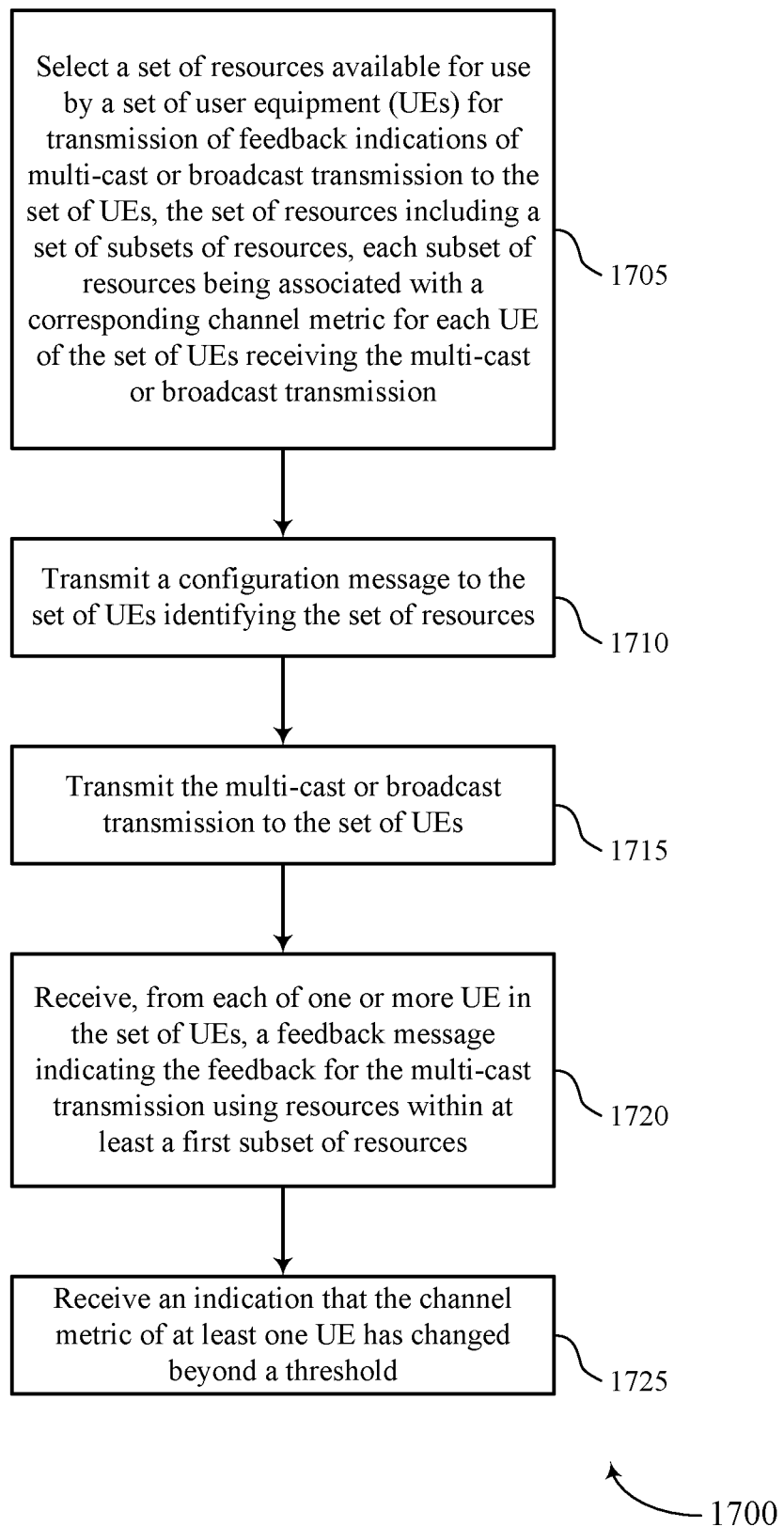

FIG. 17 shows a flowchart illustrating a method 1700 that supports control channel resources for group-feedback in multi-cast in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1705, the base station may select a set of resources available for use by a set of UEs for transmission of feedback indications of multi-cast or broadcast transmission to the set of UEs, the set of resources including a set of subsets of resources, each subset of resources being associated with a corresponding channel metric for each UE of the set of UEs receiving the multi-cast or broadcast transmission. The operations of 1705 may be performed according to the methods described herein. In some examples, aspects of the operations of 1705 may be performed by a configuration manager as described with reference to FIGS. 9 through 12.

At 1710, the base station may transmit a configuration message to the set of UEs identifying the set of resources. The operations of 1710 may be performed according to the methods described herein. In some examples, aspects of the operations of 1710 may be performed by a configuration manager as described with reference to FIGS. 9 through 12.

At 1715, the base station may transmit the multi-cast or broadcast transmission to the set of UEs. The operations of 1715 may be performed according to the methods described herein. In some examples, aspects of the operations of 1715 may be performed by a multi-cast manager as described with reference to FIGS. 9 through 12.

At 1720, the base station may receive, from each of one or more UE in the set of UEs, a feedback message indicating the feedback for the multi-cast or broadcast transmission using resources within at least a first subset of resources. The operations of 1720 may be performed according to the methods described herein. In some examples, aspects of the operations of 1720 may be performed by a feedback message manager as described with reference to FIGS. 9 through 12.

At 1725, the base station may receive an indication that the channel metric of at least one UE has changed beyond a threshold. The operations of 1725 may be performed according to the methods described herein. In some examples, aspects of the operations of 1725 may be performed by a changed channel metric manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a configuration message identifying a set of resources available for use by a plurality of UEs for transmission of feedback indications of multi-cast or broadcast transmission to the plurality of UEs, the set of resources comprising a plurality of subsets of resources, each subset of resources being associated with a corresponding channel metric for each UE of the plurality of UEs receiving the multi-cast or broadcast transmission; determining that a feedback indication is to be provided in response to the multi-cast or broadcast transmission; selecting, based at least in part on a channel metric of the UE, a first subset of the plurality of subsets of resources to use for transmitting a feedback message including the feedback indication; and transmitting the feedback message for the multi-cast or broadcast transmission using resources within the selected first subset of resources.

Aspect 2: The method of aspect 1, further comprising: autonomously selecting the first subset of resources to use based on the channel metric.

Aspect 3: The method of aspect 2, further comprising: generating a random number based at least in part on a UE-specific feature; and selecting one or more resources within the first subset of resources based at least in part on the random number.

Aspect 4: The method of any of aspects 1 through 3, further comprising: receiving a higher layer signal indicating the first subset of resources to select.

Aspect 5: The method of aspect 4, wherein the higher layer signal indicates at least a portion of the resources in the first subset of resources to select.

Aspect 6: The method of any of aspects 4 through 5, wherein the higher layer signal comprises at least one of an RRC signal, a MCCH signal, or a combination thereof.

Aspect 7: The method of any of aspects 1 through 6, further comprising: receiving at least one of a higher layer signal, a DCI, or a combination thereof, either explicitly or implicitly indicating an updated set of resources, the updated set of resources comprising a change to the subset of resources associated with each channel metric.

Aspect 8: The method of any of aspects 1 through 7, further comprising: determining that the channel metric of the UE has changed beyond a threshold; and selecting an updated subset of resources from the set of resources based at least in part on the changed channel metric of the UE.

Aspect 9: The method of aspect 8, wherein selecting the updated subset of resources comprise autonomously selecting the updated subset of resources based at least in part on the changed channel metric of the UE.

Aspect 10: The method of any of aspects 8 through 9, wherein selecting the updated subset of resources comprise transmitting an indication that the channel metric of the UE has changed beyond the threshold.

Aspect 11: The method of aspect 10, further comprising: receiving an indication of the updated subset of resources to select based at least in part on the indication that the channel metric of the UE has changed beyond the threshold.

Aspect 12: The method of any of aspects 1 through 11, wherein candidate resources in the first subset of resources comprise one or more guard symbols.

Aspect 13: The method of any of aspects 1 through 12, wherein candidate resources in the first subset of resources comprise one or more orthogonal cyclic shifts of a base sequence that are different from orthogonal cyclic shifts associated with different subsets of resources of the plurality of subsets of resources.

Aspect 14: The method of any of aspects 1 through 13, further comprising: identifying a receive beam used for the multi-cast or broadcast transmission; and selecting a transmit beam for transmitting the feedback message based at least in part on the receive beam.

Aspect 15: The method of any of aspects 1 through 14, further comprising: identifying a transmit beam associated with the selected first subset of resources; and using the transmit beam for transmitting the feedback message based at least in part on the selected first subset of resources.

Aspect 16: The method of any of aspects 1 through 15, further comprising: identifying an antenna switching configuration associated with the selected first subset of resources; and implementing the antenna switching configuration for transmitting the feedback message.

Aspect 17: The method of any of aspects 1 through 16, further comprising: identifying information associated with a timing advance associated with the selected first subset of resources; and applying the timing advance in transmitting the feedback message based at least in part on the information.

Aspect 18: The method of any of aspects 1 through 17, further comprising: determining that ACK/NACK information is to be simultaneously transmitted in response to a unicast transmission; and transmitting the feedback message indicating the ACK/NACK information and without the feedback indication.

Aspect 19: The method of any of aspects 1 through 18, further comprising: determining that ACK/NACK information is to be transmitted in response to a unicast transmission; and multiplexing the feedback indication with the ACK/NACK information for the unicast transmission.

Aspect 20: The method of any of aspects 1 through 19, wherein a quantity of resources in the first subset of resources is different from quantities of resources in one or more other subsets of resources of the plurality of subsets of resources; and each subset of resources is associated with a different range of channel metrics for the plurality of UEs.

Aspect 21: The method of aspect 20, wherein the channel metric associated with each subset of resources comprises a RSRP threshold range; and subsets of resources associated with a higher RSRP threshold range comprise a lower quantity of resources than subsets of resources associated with a lower RSRP threshold range.

Aspect 22: The method of any of aspects 1 through 21, wherein the channel metric comprises at least one of a RSRP, or a RSSI, or a beamform angle-of-arrival, or a beamform angle-of-departure, or a transmit beam, or a receive beam, or a geographical location, or an interference level, or a CSI metric, or a throughput level, or any combination thereof.

Aspect 23: The method of any of aspects 1 through 22, wherein the configuration message comprises a MCCH message.

Aspect 24: The method of any of aspects 1 through 23, wherein the resources in the set of resources comprise at least one of a frequency resource, or a time resource, or a sequence, or a spatial resource, or any combination thereof.

Aspect 25: The method of any of aspects 1 through 24, wherein the feedback indication comprises a NACK indication.

Aspect 26: The method of any of aspects 1 through 25, further comprising: identifying a duplexing configuration of the UE, wherein selecting the first subset of resources is based at least in part on the duplexing configuration.

Aspect 27: A method for wireless communication at a base station, comprising: selecting a set of resources available for use by a plurality of UEs for transmission of feedback indications of multi-cast or broadcast transmission to the plurality of UEs, the set of resources comprising a plurality of subsets of resources, each subset of resources being associated with a corresponding channel metric for each UE of the plurality of UEs receiving the multi-cast or broadcast transmission; transmitting a configuration message to the plurality of UEs identifying the set of resources; transmitting the multi-cast or broadcast transmission to the plurality of UEs; and receiving, from each of one or more UE in the plurality of UEs, a feedback message indicating the feedback for the multi-cast or broadcast transmission using resources within at least a first subset of resources.

Aspect 28: The method of aspect 27, further comprising: transmitting a higher layer signal indicating the first subset of resources for the UE to select.

Aspect 29: The method of aspect 28, wherein the higher layer signal indicates at least a portion of the resources in the first subset of resources for the UE to select.

Aspect 30: The method of any of aspects 28 through 29, wherein the higher layer signal comprises at least one of an RRC signal, a MCCH signal, or a combination thereof.

Aspect 31: The method of any of aspects 27 through 30, further comprising: transmitting at least one of a higher layer signal, a DCI, or a combination thereof, either explicitly or implicitly indicating an updated set of resources, the updated set of resources comprising a change to the subset of resources associated with each channel metric.

Aspect 32: The method of any of aspects 27 through 31, further comprising: receiving an indication that the channel metric of at least one UE has changed beyond a threshold.

Aspect 33: The method of aspect 32, further comprising: selecting an updated subset of resources from the set of resources based at least in part on the changed channel metric of the at least one UE; and transmitting an indication of the updated subset of resources to select to the at least one UE.

Aspect 34: The method of aspect 33, wherein the channel metric associated with each subset of resources comprises a RSRP threshold range; and subsets of resources associated with a higher RSRP threshold range comprise a lower quantity of resources than subsets of resources associated with a lower RSRP threshold range.

Aspect 35: The method of any of aspects 27 through 34, wherein candidate resources in the first subset of resources comprise one or more guard symbols.

Aspect 36: The method of any of aspects 27 through 35, wherein candidate resources in the first subset of resources comprise one or more orthogonal cyclic shifts of a base sequence that are different from orthogonal cyclic shifts associated with different subsets of resources of the plurality of subsets of resources.

Aspect 37: The method of any of aspects 27 through 36, wherein each feedback message is received using a UE transmit beam that is selected based at least in part on a receive beam that each UE uses to receive the multi-cast or broadcast transmission.

Aspect 38: The method of any of aspects 27 through 37, wherein each feedback message is received using a UE transmit beam that is selected based at least in part on a transmit beam associated with the subset of resources that the UE selects.

Aspect 39: The method of any of aspects 27 through 38, further comprising: receiving the feedback message according to an antenna switching configuration associated with the subset of resources that the UE selects.

Aspect 40: The method of any of aspects 27 through 39, further comprising: receiving the feedback message according to a timing advance associated with the subset of resources that the UE selects.

Aspect 41: The method of any of aspects 27 through 40, further comprising: determining that ACK/NACK information is to be simultaneously received in response to a unicast transmission; and receiving the feedback message indicating the ACK/NACK information and without the feedback indication.

Aspect 42: The method of any of aspects 27 through 41, further comprising: determining that ACK/NACK information is to be received in response to a unicast transmission; and receiving the feedback indication multiplexed with the ACK/NACK information for the unicast transmission.

Aspect 43: The method of any of aspects 27 through 42, wherein a quantity of resources in the first subset of resources is different from quantities of resources in one or more other subsets of resources of the plurality of subsets of resources; and each subset of resources is associated with a different range of channel metrics for the plurality of UEs.

Aspect 44: The method of any of aspects 27 through 43, wherein the channel metric comprises at least one of a reference signal received power (RSRP), or a reference signal strength indicator (RSSI), or a beamform angle-of-arrival, or a beamform angle-of-departure, or a transmit beam, or a receive beam, or a geographical location, or an interference level, or a CSI metric, or a throughput level, or any combination thereof.

Aspect 45: The method of any of aspects 27 through 44, wherein the configuration message comprises a MCCH message.

Aspect 46: The method of any of aspects 27 through 45, wherein the resources in the set of resources comprise at least one of a frequency resource, or a time resource, or a sequence, or a spatial resource, or any combination thereof.

Aspect 47: The method of any of aspects 27 through 46, wherein the feedback indication comprises a NACK indication.

Aspect 48: An apparatus for wireless communication at a UE, comprising a processor; memory coupled with the processor; and instructions stored in the memory and executable by the processor to cause the apparatus to perform a method of any of aspects 1 through 26.

Aspect 49: An apparatus for wireless communication at a UE, comprising at least one means for performing a method of any of aspects 1 through 26.

Aspect 50: A non-transitory computer-readable medium storing code for wireless communication at a UE, the code comprising instructions executable by a processor to perform a method of any of aspects 1 through 26.

Aspect 51: An apparatus for wireless communication at a base station, comprising a processor; memory coupled with the processor; and instructions stored in the memory and executable by the processor to cause the apparatus to perform a method of any of aspects 27 through 47.

Aspect 52: An apparatus for wireless communication at a base station, comprising at least one means for performing a method of any of aspects 27 through 47.

Aspect 53: A non-transitory computer-readable medium storing code for wireless communication at a base station, the code comprising instructions executable by a processor to perform a method of any of aspects 27 through 47.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a configuration message identifying a set of resources available for use by a plurality of UEs for transmission of feedback indications of multi-cast or broadcast transmission to the plurality of UEs, the set of resources comprising at least spatial resources divided into a plurality of subsets of resources, each subset of resources being associated with a corresponding channel metric for each UE of the plurality of UEs receiving the multi-cast or broadcast transmission;
    receiving control information indicating one or more resources to select from within each subset of resources in the set of resources, the one or more resources corresponding to a UE-specific feature;
    determining that a feedback indication is to be provided in response to the multi-cast or broadcast transmission;
    selecting, based at least in part on a channel metric of the UE, a first subset of resources of the plurality of subsets of resources;
    selecting the one or more resources within the first subset of resources in accordance with the UE-specific feature and the control information; and
    transmitting the feedback indication in a feedback message for the multi-cast or broadcast transmission using at least the one or more resources within the first subset of resources.

2. The method of claim 1, further comprising:
    autonomously selecting the first subset of resources to use based on the channel metric.

3. The method of claim 2, further comprising:
    generating a random number based at least in part on the UE-specific feature; and
    selecting the one or more resources within the first subset of resources based at least in part on the random number.

4. The method of claim 1, wherein the control information indicates at least a portion of the resources in the first subset of resources to select.

5. The method of claim 1, wherein the control information comprises at least one of a radio resource control (RRC) signal, a multi-cast control channel (MCCH) signal, or a combination thereof.

6. The method of claim 1, further comprising:
    receiving at least one of the control information, a downlink control information, or a combination thereof, either explicitly or implicitly indicating an updated set of resources, the updated set of resources comprising a change to the subset of resources associated with each channel metric.

7. The method of claim 1, further comprising:
    determining that the channel metric of the UE has changed beyond a threshold; and
    selecting an updated subset of resources from the set of resources based at least in part on the changed channel metric of the UE.

8. The method of claim 7, wherein selecting the updated subset of resources comprise:
    autonomously selecting the updated subset of resources based at least in part on the changed channel metric of the UE.

9. The method of claim 7, wherein selecting the updated subset of resources comprise:
    transmitting an indication that the channel metric of the UE has changed beyond the threshold.

10. The method of claim 9, further comprising:
    receiving an indication of the updated subset of resources to select based at least in part on the indication that the channel metric of the UE has changed beyond the threshold.

11. The method of claim 1, wherein:
    candidate resources in the first subset of resources comprise one or more guard symbols.

12. The method of claim 1, wherein:
    candidate resources in the first subset of resources comprise one or more orthogonal cyclic shifts of a base sequence that are different from orthogonal cyclic shifts associated with different subsets of resources of the plurality of subsets of resources.

13. The method of claim 1, further comprising:
    identifying a receive beam used for the multi-cast or broadcast transmission; and
    selecting a transmit beam for transmitting the feedback message based at least in part on the receive beam.

14. The method of claim 1, further comprising:
identifying a transmit beam associated with the first subset of resources; and
using the transmit beam for transmitting the feedback message based at least in part on the first subset of resources.

15. The method of claim 1, further comprising:
identifying an antenna switching configuration associated with the first subset of resources; and
implementing the antenna switching configuration for transmitting the feedback message.

16. The method of claim 1, further comprising:
identifying information associated with a timing advance associated with the first subset of resources; and
applying the timing advance in transmitting the feedback message based at least in part on the information.

17. The method of claim 1, further comprising:
determining that acknowledgement/negative-acknowledgement information is to be simultaneously transmitted in response to a unicast transmission; and
transmitting the feedback message indicating the acknowledgement/negative-acknowledgement information and without the feedback indication.

18. The method of claim 1, further comprising:
determining that acknowledgement/negative-acknowledgement information is to be transmitted in response to a unicast transmission; and
multiplexing the feedback indication with the acknowledgement/negative-acknowledgement information for the unicast transmission.

19. The method of claim 1, wherein:
a quantity of resources in the first subset of resources is different from quantities of resources in one or more other subsets of resources of the plurality of subsets of resources; and
each subset of resources is associated with a different range of channel metrics for the plurality of UEs.

20. The method of claim 19, wherein:
the channel metric associated with each subset of resources comprises a reference signal received power (RSRP) threshold range; and
subsets of resources associated with a higher RSRP threshold range comprise a lower quantity of resources than subsets of resources associated with a lower RSRP threshold range.

21. The method of claim 1, wherein the channel metric comprises at least one of a reference signal received power (RSRP), or a reference signal strength indicator (RSSI), or a beamform angle-of-arrival, or a beamform angle-of-departure, or a transmit beam, or a receive beam, or a geographical location, or an interference level, or a channel state information (CSI) metric, or a throughput level, or any combination thereof.

22. The method of claim 1, wherein the configuration message comprises a multi-cast control channel (MCCH) message.

23. The method of claim 1, wherein the resources in the set of resources further comprise at least one of a frequency resource, or a time resource, or a sequence, or any combination thereof.

24. The method of claim 1, wherein the feedback indication comprises a negative-acknowledgement indication.

25. The method of claim 1, further comprising:
identifying a duplexing configuration of the UE, wherein selecting the first subset of resources is based at least in part on the duplexing configuration.

26. An apparatus for wireless communication at a user equipment (UE), comprising:
at least one processor,
memory coupled with the at least one processor; and
instructions stored in the memory and executable by the at least one processor to cause the apparatus to:
receive a configuration message identifying a set of resources available for use by a plurality of UEs for transmission of feedback indications of multi-cast or broadcast transmission to the plurality of UEs, the set of resources comprising at least spatial resources divided into a plurality of subsets of resources, each subset of resources being associated with a corresponding channel metric for each UE of the plurality of UEs receiving the multi-cast or broadcast transmission;
receive control information indicating one or more resources to select from within each subset of resources in the set of resources, the one or more resources corresponding to a UE-specific feature;
determine that a feedback indication is to be provided in response to the multi-cast or broadcast transmission;
select, based at least in part on a channel metric of the UE, a first subset of resources of the plurality of subsets of resources;
selecting the one or more resources within the first subset of resources in accordance with the UE-specific feature and the control information; and
transmit the feedback indication in a feedback message for the multi-cast or broadcast transmission using at least the one or more resources within the first subset of resources.

27. The apparatus of claim 26, wherein the instructions are further executable by the at least one processor to cause the apparatus to:
autonomously select the first subset of resources to use based on the channel metric.

28. An apparatus for wireless communication at a user equipment (UE), comprising:
means for receiving a configuration message identifying a set of resources available for use by a plurality of UEs for transmission of feedback indications of multi-cast or broadcast transmission to the plurality of UEs, the set of resources comprising at least spatial resources divided into a plurality of subsets of resources, each subset of resources being associated with a corresponding channel metric for each UE of the plurality of UEs receiving the multi-cast or broadcast transmission;
means for receiving control information indicating one or more resources to select from within each subset of resources in the set of resources, the one or more resources corresponding to a UE-specific feature;
means for determining that a feedback indication is to be provided in response to the multi-cast or broadcast transmission;
means for selecting, based at least in part on a channel metric of the UE, a first subset of resources of the plurality of subsets of resources;
means for selecting the one or more resources within the first subset of resources being in accordance with the UE-specific feature and the control information; and
means for transmitting the feedback indication in a feedback message for the multi-cast or broadcast transmission using at least the one or more resources within the first subset of resources.

29. A non-transitory computer-readable medium storing code for wireless communication at a user equipment (UE), the code comprising instructions executable by at least one processor to:
- receive a configuration message identifying a set of resources available for use by a plurality of UEs for transmission of feedback indications of multi-cast or broadcast transmission to the plurality of UEs, the set of resources comprising at least spatial resources divided into a plurality of subsets of resources, each subset of resources being associated with a corresponding channel metric for each UE of the plurality of UEs receiving the multi-cast or broadcast transmission;
- receive control information indicating one or more resources to select from within each subset of resources in the set of resources, the one or more resources corresponding to a UE-specific feature;
- determine that a feedback indication is to be provided in response to the multi-cast or broadcast transmission;
- select, based at least in part on a channel metric of the UE, a first subset of resources of the plurality of subsets of resources;
- select the one or more resources within the first subset of resources being in accordance with the UE-specific feature and the control information; and
- transmit the feedback indication in a feedback message for the multi-cast or broadcast transmission using at least the one or more resources within the first subset of resources.

* * * * *